(12) United States Patent
Sinha et al.

(10) Patent No.: US 10,577,915 B2
(45) Date of Patent: Mar. 3, 2020

(54) SONIC LOGGING FOR ASSESSING WELL INTEGRITY

(71) Applicant: SCHLUMBERGER TECHNOLOGY CORPORATION, Sugar Land, TX (US)

(72) Inventors: Bikash K. Sinha, Cambridge, MA (US); Ting Lei, Cambridge, MA (US); Smaine Zeroug, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1083 days.

(21) Appl. No.: 14/157,391

(22) Filed: Jan. 16, 2014

(65) Prior Publication Data

US 2015/0198032 A1    Jul. 16, 2015

(51) Int. Cl.
     *E21B 47/00*      (2012.01)
     *E21B 47/10*      (2012.01)
     *G01V 1/44*      (2006.01)

(52) U.S. Cl.
     CPC ........ *E21B 47/0005* (2013.01); *E21B 47/101* (2013.01); *G01V 1/44* (2013.01)

(58) Field of Classification Search
None
See application file for complete search history.

(56) References Cited

U.S. PATENT DOCUMENTS

| | | | | |
|---|---|---|---|---|
| 4,551,823 A * | 11/1985 | Carmichael | ......... | E21B 47/0005 181/105 |
| 4,893,496 A * | 1/1990 | Bau | ....... | E21B 47/101 73/152.55 |
| 5,687,138 A * | 11/1997 | Kimball | ...... | G01V 1/50 367/25 |
| 5,831,934 A * | 11/1998 | Gill | ........ | G01V 1/48 367/25 |
| 6,483,777 B1 | 11/2002 | Zeroug | | |
| 6,678,616 B1 * | 1/2004 | Winkler | ...... | G01V 1/44 181/104 |

(Continued)

FOREIGN PATENT DOCUMENTS

WO    WO 2012087796 A2 *   6/2012      ........... G01V 1/50

OTHER PUBLICATIONS

International Search Report and Written Opinion of corresponding PCT Application No. PCT/US2014/070255 dated Apr. 1, 2015, 18 pages.

(Continued)

*Primary Examiner* — John E Breene
*Assistant Examiner* — Brandon J Becker

(57) ABSTRACT

Methods are disclosed for detecting fluid in at least one annulus around at least one casing installed in a borehole traversing a formation utilizing a sonic tool. The sonic tool is activated in the borehole and the received sonic waveforms are processed to obtain a dispersion plot. A reference dispersion plot is generated using a model of the borehole where the casing is well-bonded by cement. The obtained and reference dispersion plots are compared. An indication of fluid and in some cases, the specific radial location thereof is obtained based on the signature of the obtained plot as opposed to the reference plot. The methods are effective in doubly-cased boreholes using monopole and/or dipole sources.

30 Claims, 30 Drawing Sheets

(56) References Cited

U.S. PATENT DOCUMENTS

| | | | |
|---|---|---|---|
| 7,120,541 B2 | 10/2006 | Wang | |
| 7,525,872 B2* | 4/2009 | Tang | G01V 1/50 181/105 |
| 7,669,653 B2* | 3/2010 | Craster | E21B 23/06 166/101 |
| 2003/0156491 A1 | 8/2003 | McDaniel et al. | |
| 2003/0156494 A1 | 8/2003 | McDaniel et al. | |
| 2004/0008027 A1* | 1/2004 | Prammer | G01N 24/081 324/303 |
| 2005/0067191 A1* | 3/2005 | Miyamoto | G01V 1/52 175/50 |
| 2005/0190651 A1 | 9/2005 | Plona et al. | |
| 2005/0209912 A1* | 9/2005 | Veeningen | G06Q 10/06 705/7.12 |
| 2005/0241855 A1 | 11/2005 | Wylie et al. | |
| 2006/0016592 A1* | 1/2006 | Wu | E21B 21/08 166/250.07 |
| 2006/0233048 A1* | 10/2006 | Froelich | G01V 1/50 367/35 |
| 2006/0285437 A1* | 12/2006 | Sinha | G01V 1/50 367/37 |
| 2007/0268782 A1* | 11/2007 | Pabon | G01V 1/50 367/31 |
| 2008/0175099 A1* | 7/2008 | Hawthorn | G01V 1/50 367/25 |
| 2009/0005995 A1* | 1/2009 | Tang | G01V 1/50 702/11 |
| 2009/0145600 A1* | 6/2009 | Wu | G01V 1/50 166/250.02 |
| 2009/0168597 A1* | 7/2009 | Wu | E21B 47/0005 367/35 |
| 2009/0211763 A1* | 8/2009 | Fowler | B01D 19/0057 166/357 |
| 2009/0257307 A1* | 10/2009 | Valero | G01V 1/50 367/31 |
| 2010/0200296 A1* | 8/2010 | Camwell | E21B 47/02208 175/50 |
| 2011/0199228 A1* | 8/2011 | Roddy | E21B 33/13 340/856.4 |
| 2012/0037423 A1* | 2/2012 | Geerits | E21B 47/00 175/50 |
| 2013/0289881 A1 | 10/2013 | Sinha | |

OTHER PUBLICATIONS

Braunisch et al., "Inversion of guided-wave dispersion data with application to borehole acoustics," J. Acoust. Soc. Am., Jan. 2004, vol. 115(1): pp. 269-279.

Ekstrom, "Dispersion Estimationi from Borehole Acoustic Arrays Using a modified Matrix Pencil Algorithm," 29th Asilomar Conference on Signals System. Comput., Oct. 1995: pp. 449-453.

Lang et al., "Estimating slowness dispersion from arrays of sonic logging waveforms," Geophysics, Apr. 1987, vol. 52(4): pp. 530-544.

Liu et al., "Multipole acoustic waveforms in fluid-filled boreholes in biaxially stressed formations: A finite-difference method," Geophysics, Jan.-Feb. 2000, vol. 65(1): pp. 190-201.

Liu et al., "A 3D cylindrical PML/FDTD method for elastic waves in fluid-filled pressurized boreholes in triaxially stressed formations," Geophysics, Sep.-Oct. 2003, vol. 68(5): pp. 1731-1743.

Sinha, "Sensitivity and inversion of borehole flexural dispersions for formation parameters," Geophys. J. Int., 1997, vol. 128: pp. 84-96.

Sinha et al., "Higher-Order Modes in a Fluid-Filled Borehole," IEEE Ultrosonics Symposium, 1998: pp. 1115-1120.

Sinha et al., "Dispersion and radial depth of investigation of borehole modes," Geophysical Prospecting, 2004, vol. 52(4): pp. 271-286.

Sinha et al., "Influence of a pipe tool on borehole modes," Geophysics, May-Jun. 2009, vol. 74(3): pp. E111-E123.

\* cited by examiner

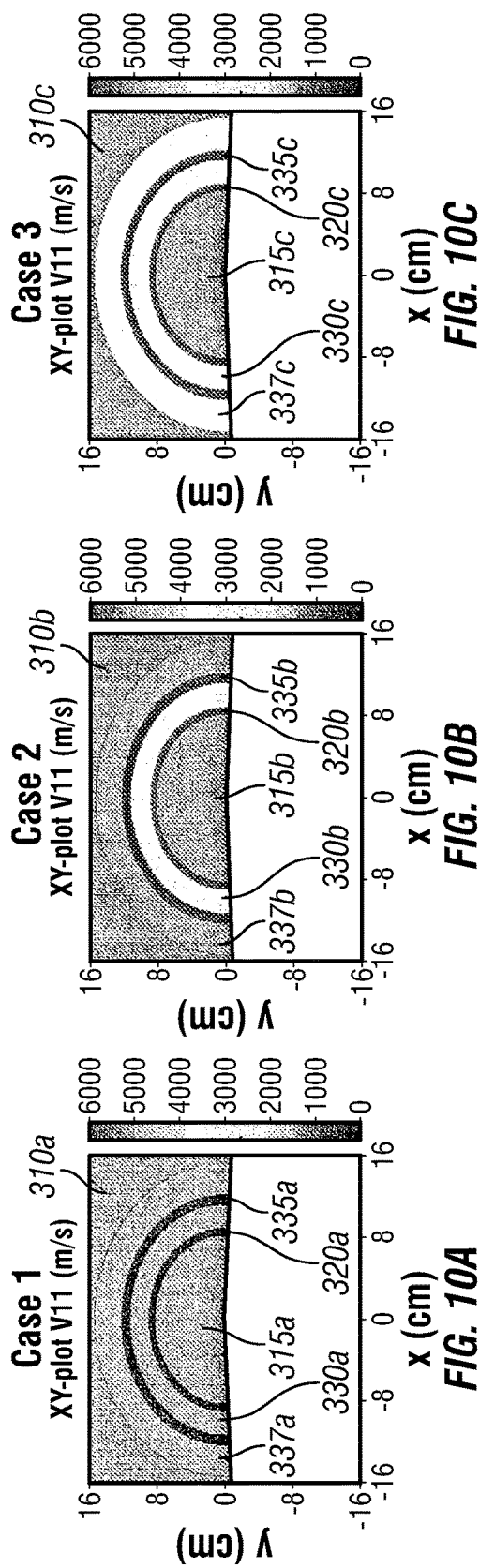
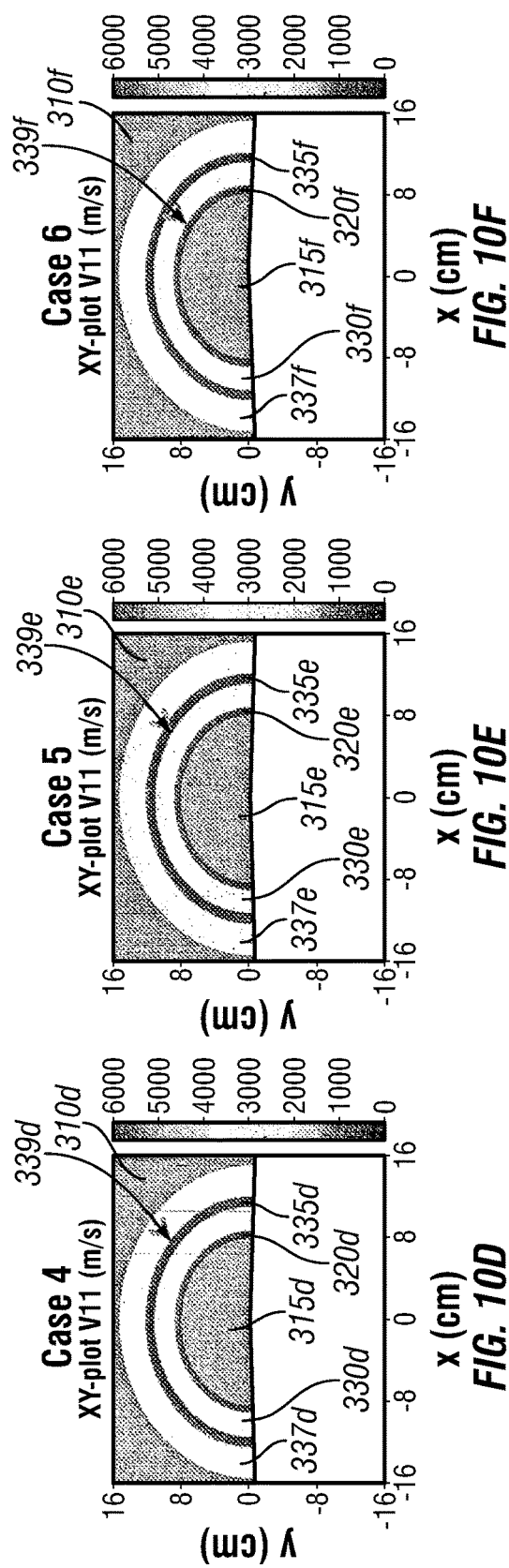

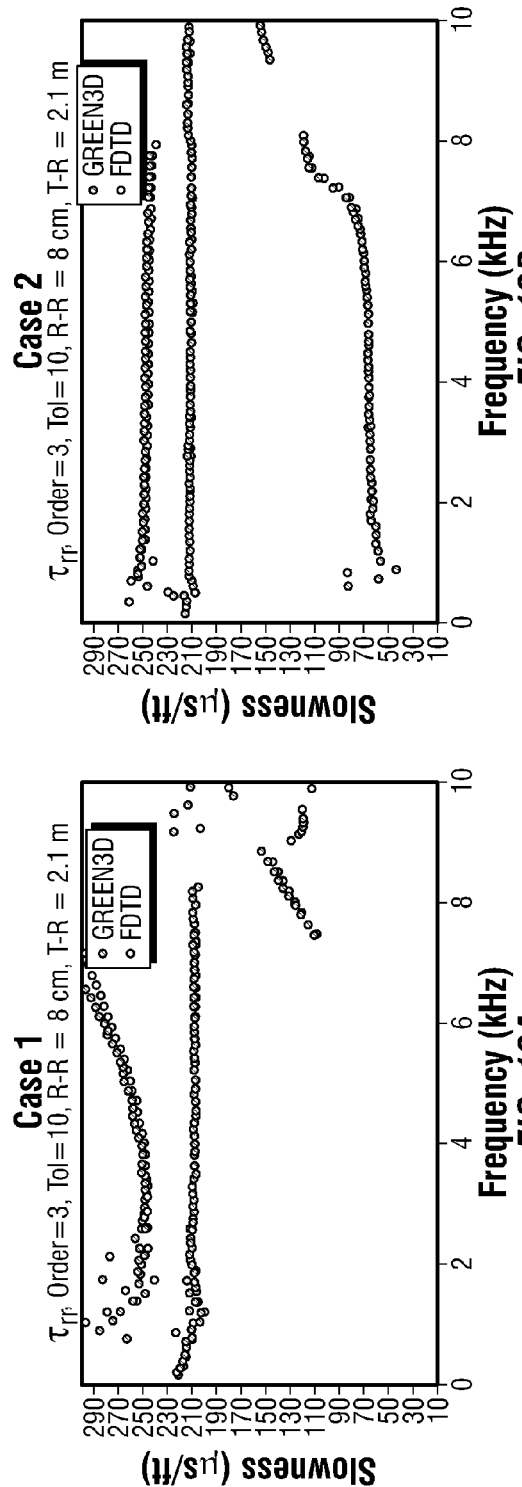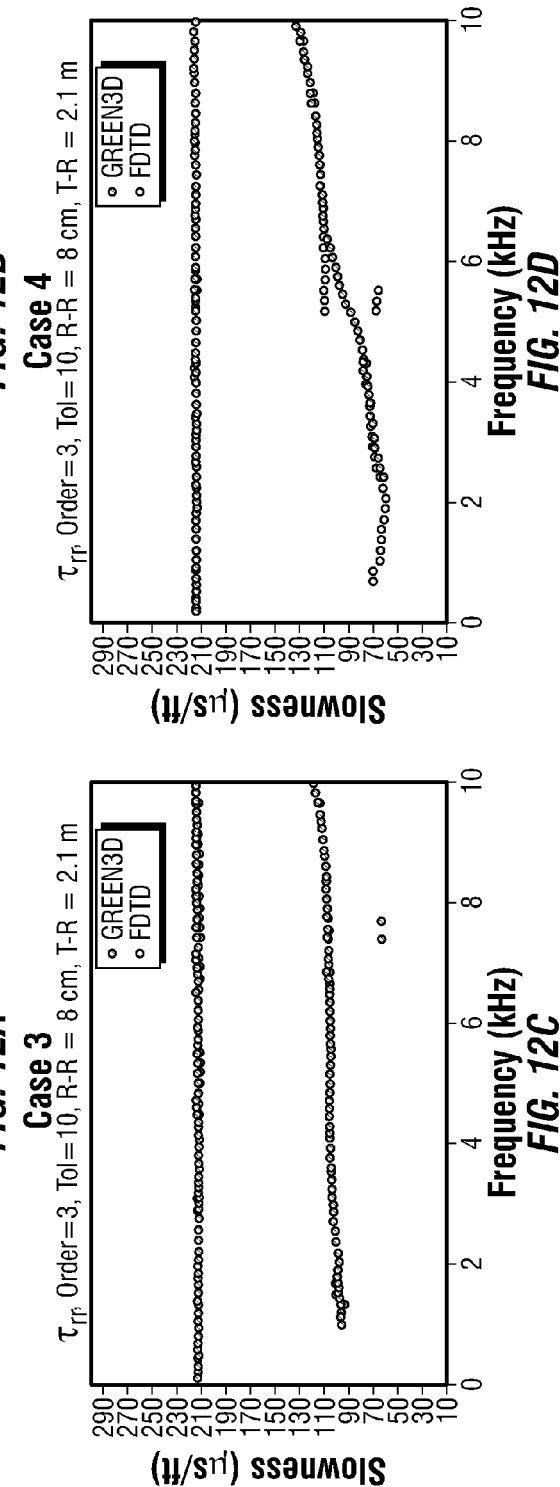
FIG. 12A  FIG. 12B  FIG. 12C  FIG. 12D

SONIC LOGGING FOR ASSESSING WELL INTEGRITY

BACKGROUND

Field

The subject disclosure relates generally to the testing of subsurface well integrity. More particularly, the subject disclosure relates to sonic logging methods and apparatus for analyzing the condition of the cement about the casing(s) of single or double-cased wells.

State of the Art

In order to produce hydrocarbons from a geological formation, it is common to drill one or more boreholes in the formation and to install metal tubes (e.g., steel casing) that are cemented into place into each borehole. In some situations, a single casing is cemented in place in the borehole. In other situations, concentric casings are cemented in place, with cement between the casings and cement between the outer casing and the borehole. Holes in the casing and cement are created in order to establish a fluid connection between the reservoir and a producing wellbore. It is generally desirable that the cement fill entirely the space between the formation and the casing (and between the concentric casings where such an arrangement is used), as otherwise, different layers of the formation can be in uncontrolled fluid communication with each other via the borehole outside the casing. The functionality of the cement in preventing fluid communication between different formation layers, which is based on the structural integrity of the cement, is often referred to as "well integrity."

Well integrity can be compromised because of a variety of cement defects ranging from debonding at an interface between the steel casing and cement or between the cement and the formation, to the presence of fluid channels in the cement annuli, to defects resulting from mud contamination of the cement slurry during the curing phase and from eccentered casings. Debonding at interfaces occurs because of several mechanisms including differences in the thermal expansion coefficients of the steel, cement and formation and cooling of the cement annulus as it cures, as well as casing expansion and contraction due to production-induced pressure changes within the inner casing. It may also be due to mud left on the casing or mudcake on the formation that prevents the cement from properly sealing to the casing and to the formation, respectively. Any presence of fluid channels in the cement weakens the cement integrity and can be a potential source of unwanted fluid communication between a reservoir and cap rocks.

One tool used for measuring formation characteristics is a sonic tool. The sonic tool may be used in a fluid-filled uncased borehole or in a fluid-filled cased wellbore. The sonic tool uses an acoustic source that generates head waves as well as relatively stronger borehole-guided modes in the fluid-filled borehole or well. More particularly, a sonic tool including a piezoelectric source and an array of hydrophone receivers is placed inside a fluid-filled borehole. The piezoelectric source is configured in the form of either a monopole or a dipole source. The source bandwidth typically ranges from a 0.5 to 20 kHz. A monopole source generates primarily a lowest-order axisymmetric mode, also referred to as the Stoneley mode, together with compressional and shear head waves. In contrast, a dipole source primarily excites the lowest-order flexural borehole mode together with compressional and shear head waves. The head waves are caused by the coupling of the transmitted acoustic energy to plane waves in the formation that propagate along the borehole axis. An incident compressional wave in the borehole fluid produces critically refracted compressional waves in the formation. Those refracted along the borehole surface are known as compressional head waves. The critical incidence angle $\theta_i = \sin^{-1}(V_f/V_c)$, where $V_f$ is the compressional wave speed in the borehole fluid, and $V_c$ is the compressional wave speed in the formation. As the compressional head wave travels along the interface, it radiates energy back into the fluid that can be detected by hydrophone receivers placed in the fluid-filled borehole. In "fast" formations, the shear head wave can be similarly excited by a compressional wave at the critical incidence angle $\theta_i = \sin^{-1}(V_f/V_s)$, where $V_s$ is the shear wave speed in the formation. It is noted that head waves are excited only when the wavelength of the incident wave is smaller than the borehole diameter so that the boundary can be effectively treated as a planar interface. In a homogeneous and isotropic model of fast formations, compressional and shear head waves can be generated by a monopole source placed in a fluid-filled borehole for determining the formation compressional and shear wave speeds. It is known that refracted shear head waves cannot be detected in "slow" formations (where the shear wave velocity is less than the borehole-fluid compressional velocity) with receivers placed in the borehole fluid. In slow formations, formation shear velocities are obtained from the low-frequency asymptote of flexural dispersion.

Standard processing techniques have been developed for the estimation of formation shear velocities in either fast or slow formations from an array of recorded dipole waveforms. One of the techniques is known as the Slowness-Time-Coherence (STC) processing algorithm which estimates a non-dispersive slowness of an arrival from an array of waveforms over a chosen frequency filter and sampling window. Another technique uses variations of Prony's algorithm that isolates both dispersive and non-dispersive arrivals in a recorded wave train. Sonic logging provides measurements of non-dispersive and dispersive arrivals that can be analyzed to estimate elastic properties of the propagating medium.

These measurements in cased holes encounter additional challenges because of the presence of the steel casing bonded to the cement annulus. The steel casing is a strong waveguide and its associated modes interact with the formation modes. Interaction of the steel casing modes with those of the formation modes is strongly dependent on the mechanical properties of the cement annulus as well as the bond quality between the steel casing and formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In embodiments, methods are disclosed comprising modeling Stoneley and/or flexural dispersions of a well-bonded cased-hole configuration to obtain model indications of slowness as a function of frequency, utilizing a sonic tool in the borehole with a monopole and/or dipole source and a plurality of receivers, processing information obtained by the plurality of receivers to obtain an indication of detected slowness as a function of frequency, and comparing the detected and modeled slownesses as a function of frequency to obtain an indication of the well integrity.

In one embodiment, a Stoneley dispersion obtained from processing information gathered by a sonic tool with a monopolar source is compared to a reference (modeled) Stoneley dispersion, and debonding of a cement annulus around a casing from the casing or from the formation or a fluid layer in the cement annulus is indicated by the measured Stoneley slownesses at high frequencies determined by the tool being greater than the modeled Stoneley slownesses at those frequencies.

In one embodiment, a flexural dispersion obtained from processing information gathered by a sonic tool with a dipole source source is compared to a reference (modeled) flexural dispersion, and debonding of a cement annulus around a casing from the casing or from the formation or a fluid layer in the cement annulus is indicated by the kick-in frequency of the measured flexural dispersion being lower than the kick-in frequency of the modeled flexural dispersion.

In one aspect, a comparison of the measured Stoneley and dipole flexural dispersions with those for a reference well-bonded cased-hole configuration reveals a variety of signatures associated with different types of cement defects, such as the presence of debonding and fluid layers in the cement annuli. For example, where the Stoneley dispersion is slower than the model, and there is extended ringing in the detected waveform and the presence of two Stoneley dispersions and the absence of a pseudo-Rayleigh mode, it may be concluded that a double casing with fluid layers instead of cement annuli is present. As another example, where the Stoneley dispersion is slower than the model and there are two dominant dispersive arrivals and two Stoneley dispersions and a casing extensional mode, it may be concluded that there is a fluid layer between the second casing and the formation. As yet another example, where the Stoneley dispersion is slower than the model and compact waveforms are present and a casing extensional mode is present, and there is an absence of the pseudo-Rayleigh mode, it may be concluded that there are cement annuli outside both the first and second casings with a linear slip. Signatures associated with flexural dispersions also point various cement defects.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein:

FIGS. 10a-10f show partial schematics of a concentrically placed double casing with a water-filled borehole and with six different arrangements of cement and/or water between the casings and the formation, with FIG. 10a showing the casings with two water annuli, FIG. 10b showing a well-bonded cement between the casings and water between the outer casing and the formation, FIG. 10c showing the casings with well-bonded cement annuli, FIG. 10d showing the casings with a well-bonded cement between the casings, and a linear-slip simulating a micro-annulus on the outside surface internal a second cement annulus, FIG. 10e showing the casings with a well-bonded cement between the outer casing and the formation and a linear-slip simulating a micro-annulus on the inside surface of the second casing external the inner cement annulus, and FIG. 10f showing the casings with a well-bonded cement between the outer casing and the formation and a linear-slip simulating a micro-annulus on the outer surface of the inner casing and internal the inner cement annulus.

FIGS. 12a-12f are synthetic slowness versus frequency plots respectively showing the dispersions resulting from processing the waveform plots of FIGS. 11a-11f, and in particular, with FIGS. 12a and 12b showing dual Stoneley dispersions, and FIGS. 12d-12f showing casing extensional dispersions;

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice.

Figure 1:
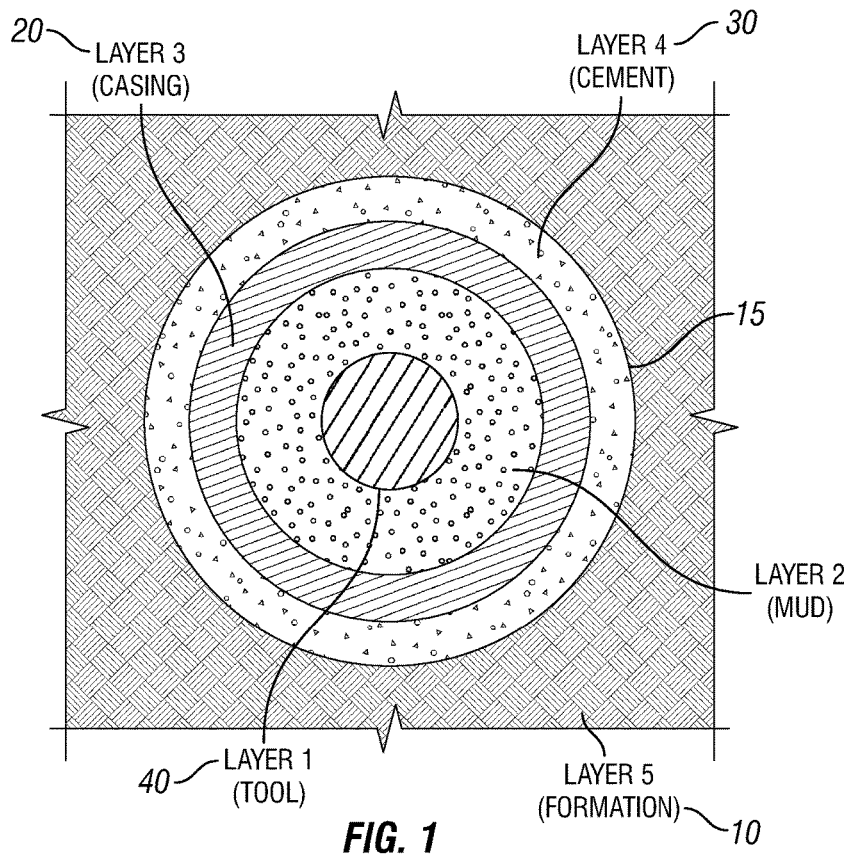
FIG. 1 is a cross-sectional view of a borehole in a formation with a concentrically placed sonic tool, steel casing, and cement annulus.

Turning to FIG. 1, a cross-sectional view is provided of a formation 10 traversed by a borehole 15 of radius 15.24 cm (6 inch radius-12 inch diameter) having a concentrically placed steel casing 20 of outer radius 8.89 cm (3.5 inch radius-7 inch diameter) cemented in place by a cement annulus 30 of thickness of 6.35 cm (2.5 inch). A sonic tool 40 is concentrically located on the borehole axis. The casing 20 is typically filled with a fluid such as water or mud. Table 1 contains material parameters used in obtaining modeling results that, as described hereinafter, are utilized in methods for assessing well integrity:

TABLE 1

Material parameters

| Material | Vp (m/s) | Vs (m/s) | Mass density (g/cc) |
| --- | --- | --- | --- |
| Formation | 4877 | 2816 | 2.579 |
| Steel casing | 5800 | 3100 | 7.9 |
| Cement G (Neat) | 3652 | 2015 | 1.9 |
| Cement CemCrete | 1935 | 750 | 1.43 |
| Borehole fluid/water | 1500 | 0 | 1.0 | where Vp is the compressional wave velocity and Vs is the shear wave velocity.

Figure 2:
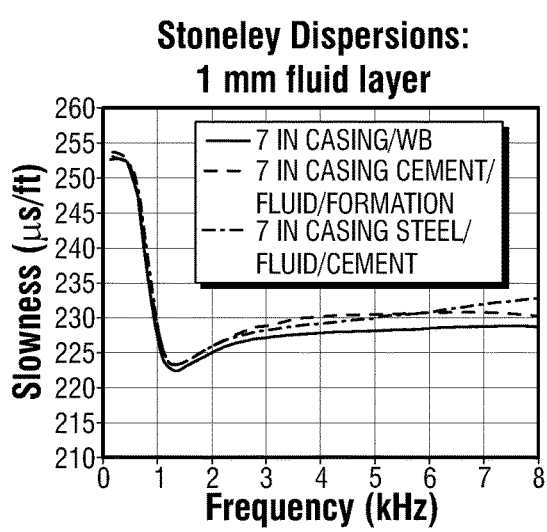
FIG. 2 is a slowness versus frequency plot comparing Stoneley dispersions for a single-cased borehole in the presence of a fluid annulus of 1 mm between cement and formation, a fluid annulus of 1 mm between the steel casing and cement, and a reference Stoneley dispersion for a well-bonded cased-hole.
Figure 3:
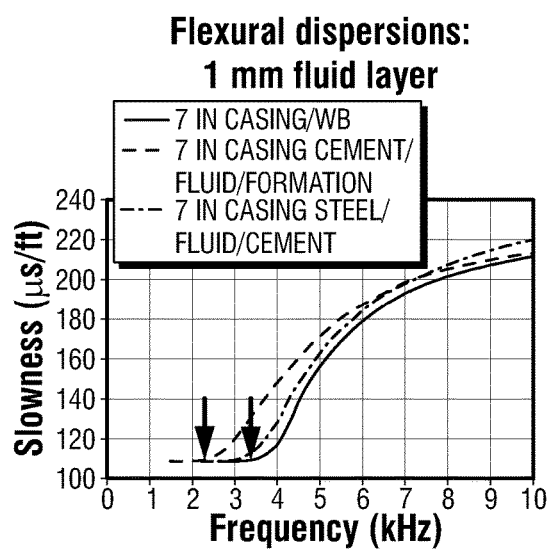
FIG. 3 is a slowness versus frequency plot comparing flexural dispersions for a single-cased borehole in the presence of a fluid annulus of 1 mm between cement and formation, a fluid annulus of 1 mm between the steel casing and cement, and a reference flexural dispersion for a well-bonded cased-hole.

FIGS. 2 and 3 each provide three curves of slowness as a function of frequency with FIG. 2 plotting Stoneley dispersions and FIG. 3 plotting flexural dispersions. Curve A of FIG. 2 denotes the monopole Stoneley dispersion resulting from the borehole arrangement of FIG. 1 where the annulus 30 is a well-bonded cement that provides complete hydraulic isolation of the reservoir fluid; i.e., no fluid communication into cap rocks. Similarly, curve A of FIG. 3 represents the dipole flexural dispersion associated with a well-bonded cement that will not allow any fluid communication into cap rocks. All monopole Stoneley and dipole flexural dispersions in this reference state as well as in the presence of water layers are computed from a root-finding mode-search routine that accounts for the presence of a sonic tool structure.

In FIGS. 2 and 3, the presence of a water layer of 1 mm between the steel casing 20 and the cement annulus 30 causes a perturbation in the Stoneley dispersion as shown by curve B in FIG. 2 and a perturbation in the flexural dispersion as shown by curve B in FIG. 3. It can be seen that the Stoneley slownesses at frequencies between 3 and 8 kHz of curve B of FIG. 2 are significantly larger than the reference Stoneley dispersion for the well-bonded situation (curve A). The influence of this water layer of 1 mm is also manifested in a shift in the kick-in frequency of dipole dispersion from about 3.5 kHz in the reference well-bonded case (curve A of FIG. 3) to about 3 kHz as seen with respect to curve B of FIG. 3. In addition, there is larger increase the flexural slownesses at higher frequencies from 4 to 10 kHz.

Similarly, the presence of a water layer of 1 mm between the cement 30 and the formation 10 results in the Stoneley dispersion denoted by the curve C in FIG. 2 that has an increased slowness between 2 to 8 kHz relative to the reference Stoneley dispersion for the well-bonded case. The same water layer of 1 mm between the cement and formation introduces a larger shift in the kick-in frequency of the dipole dispersion from about 3.5 kHz in the reference state to about 2.5 kHz as seen with respect to curve C in FIG. 3. In addition, there are significant increases in the flexural slownesses at from 3 to 8 kHz relative to the reference flexural dispersion for the well-bonded case.

According to one aspect, as described hereinafter, a comparison of (i) the Stoneley (monopole) and/or flexural (dipole) dispersion(s) of a model borehole with a well-bonded casing, and (ii) the Stoneley and/or flexural dispersion(s) calculated after using a sonic tool in a cased borehole and processing the resulting signals at one or more locations in the borehole, provides an indication of the integrity of the borehole casing at those one or more locations.

Figure 4:
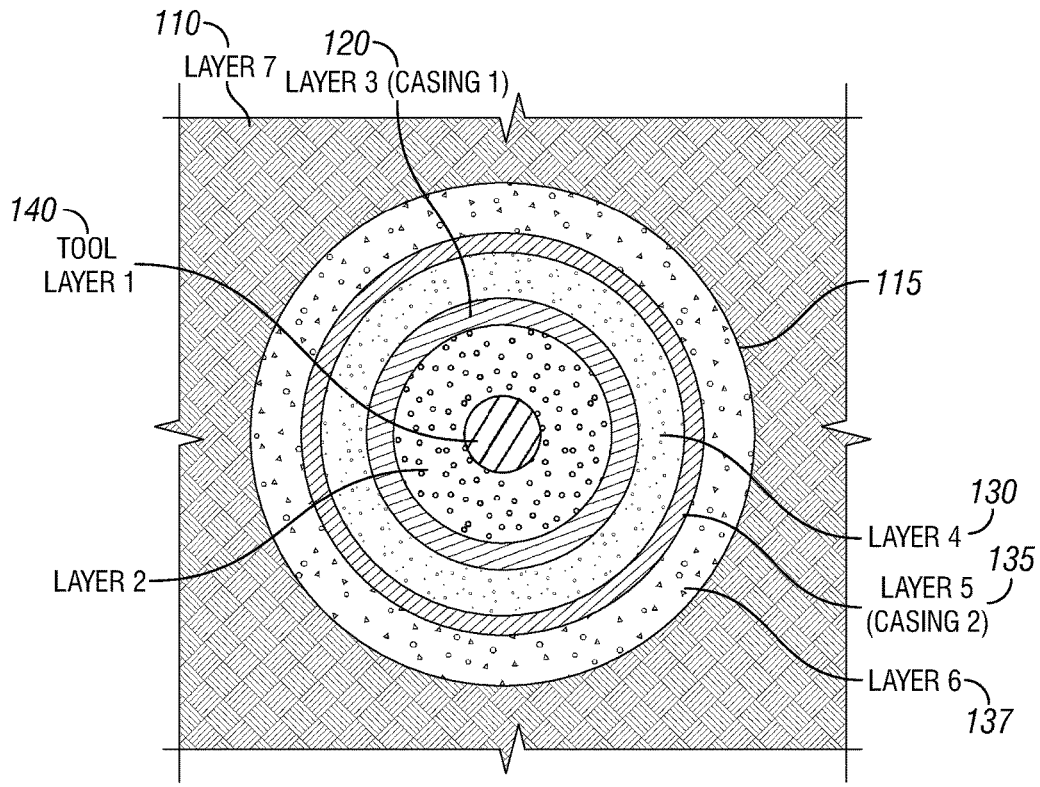
FIG. 4 is a cross-sectional view of two concentrically placed steel casings in a borehole, two cement annuli between the casings and between the outer casing and a formation, and a sonic tool at the center of the borehole.

Turning now to FIG. 4, a cross-sectional view of a double-cased borehole is seen. In FIG. 4, a formation 110 traversed by a borehole 115 of radius 15.24 cm (6 inch radius-12 inch diameter) is provided with a concentrically placed steel casing 120 of outer radius 8.89 cm (3.5 inch radius-7 inch diameter) surrounded by a thin first cement annulus 130, and an outer casing 135 of radius 11.12 cm (4.3775 inch) cemented in place by a second cement annulus 137 of approximately 4.12 cm (1.62 inch) thickness. A sonic tool 140 is concentrically located on the borehole axis. The inner casing 120 is typically filled with a fluid such as water or mud.

Figure 5:
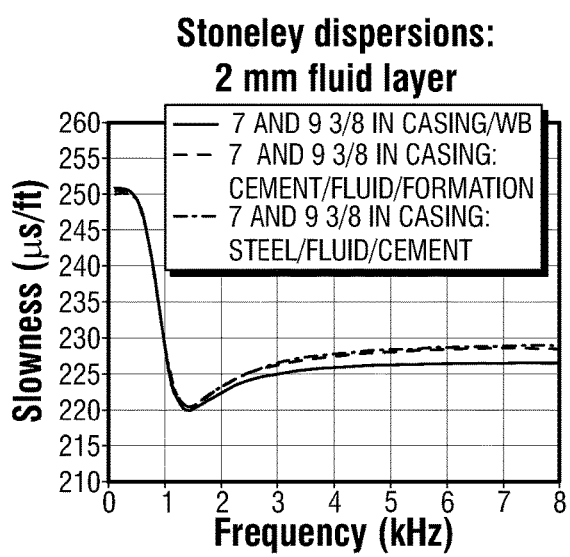
FIG. 5 is a slowness versus frequency plot comparing Stoneley dispersions for a double-cased borehole in the presence of a fluid annulus of 2 mm between cement and formation, a fluid annulus of 2 mm between the steel casing and cement, and a reference flexural dispersion for a well-bonded cased-hole.
Figure 6:
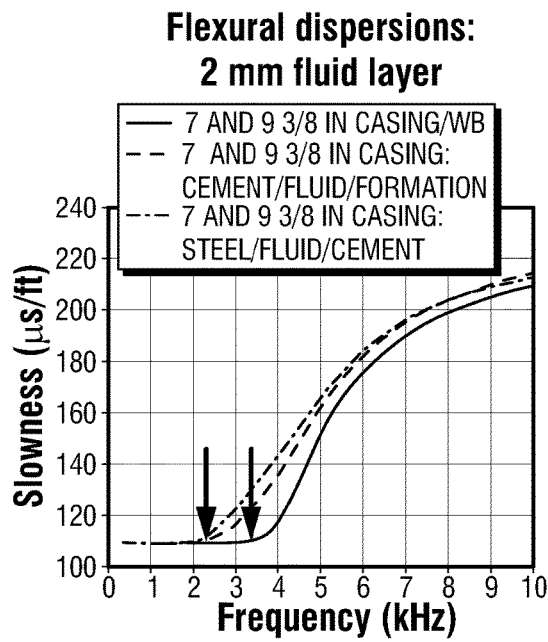
FIG. 6 is a slowness versus frequency plot comparing flexural dispersions for a double-cased borehole in the presence of a fluid annulus of 2 mm between cement and formation, a fluid annulus of 2 mm between the outer steel casing and cement, and a reference flexural dispersion for a well-bonded cased-hole.

FIGS. 5 and 6 each provide three curves of slowness as a function of frequency with FIG. 5 plotting Stoneley dispersions and FIG. 6 plotting flexural dispersions. Curve A of FIG. 5 denotes the monopole Stoneley dispersion resulting from the borehole arrangement of FIG. 4 where the annuli 130 and 137 are well-bonded cement. Similarly, curve A of FIG. 6 represents the dipole flexural dispersion associated with well-bonded cement annuli.

Curve B of FIG. 5 plots the Stoneley dispersions resulting from the presence of a fluid annulus of 2 mm between the outer cement annulus 137 and the formation 110, while curve C of FIG. 5 plots the Stoneley dispersions resulting from the presence of a fluid annulus of 2 mm between the outer steel casing 135 and the second cement annulus 137. In both cases the presence of a fluid annulus between the outer steel casing and formation causes the Stoneley dispersion to become slower between 3 and 8 kHz than that of a reference Stoneley dispersion for the well-bonded case (curve A).

Curve B of FIG. 6 similarly plots the flexural dispersions resulting from the presence of a 2 mm fluid annulus between the outer cement 137 and the formation 110, while curve C of FIG. 6 plots the flexural dispersions resulting from the presence of a fluid annulus of 2 mm between the outer steel casing 135 and the second cement annulus 137. Both cases illustrate a shift in the kick-in frequency from that in the reference state caused by the presence of a fluid layer even when the fluid annulus is in the annular space outside the second steel casing. Both cases also illustrate an increased slowness from 2.5 to 10 kHz. The presence of these fluid annuli cannot be detected by conventional ultrasonic methods.

Figure 7:
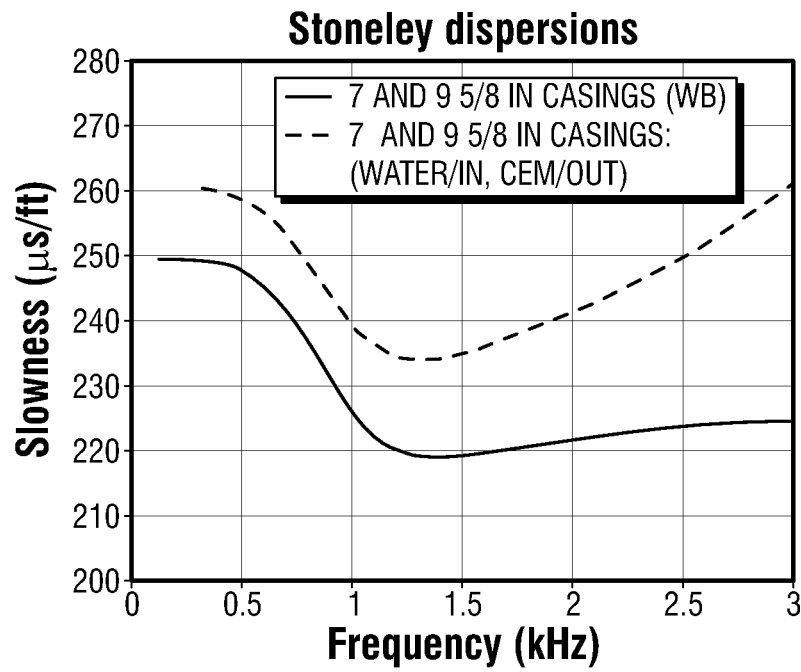
FIG. 7 is a slowness versus frequency plot comparing Stoneley dispersions for a double-cased borehole with a fluid annulus between the inner and outer steel casings and a well bonded cement between the outer casing and formation, and a reference Stoneley dispersion for a well-bonded double cased borehole.

FIG. 7 provides two Stoneley dispersions curves. Curve A represents a reference Stoneley dispersion for a well-bonded cased-hole, while curve B represents a Stoneley dispersion resulting from the presence of a thick fluid annulus between the inner and outer steel casings 130, 135, and well-bonded cement between the outer casing 135 and formation 110. It will be appreciated that the presence of a fluid annulus between the inner and outer casings causes a large increase in the Stoneley slownesses at all frequencies relative to the reference well-bonded case.

Figure 8:
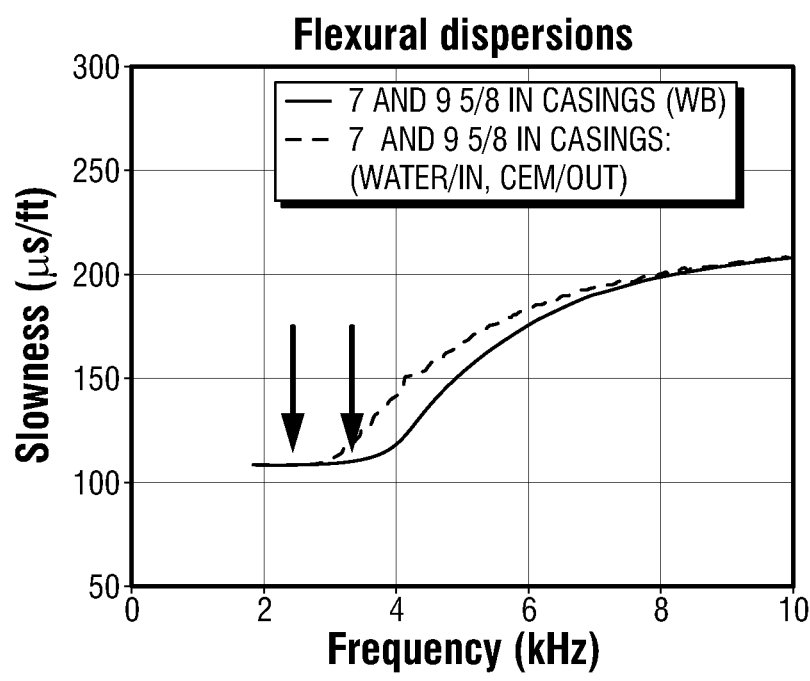
FIG. 8 is a slowness versus frequency plot comparing flexural dispersions for a double-cased borehole with a fluid annulus between the inner and outer steel casings and a well bonded cement between the outer casing and formation, and a reference Stoneley dispersion for a well-bonded double cased borehole.

Likewise, FIG. 8 provides two flexural dispersion curves with curve A representing a reference flexural dispersion for a well-bonded cased-hole while curve B represents a flexural dispersion in the presence of a thick fluid annulus between the inner and outer steel casings 130, 135, and well-bonded cement between the outer casing 135 and the formation 110. FIG. 8 reveals a shift in the kick-in frequency resulting from the presence of a fluid layer between the steel casings. In addition to the change of kick-in frequency, it is noted that in FIG. 8 the difference in flexural slownesses resulting from the fluid annulus and represented by curves A and B is primarily found above 3 kHz and below 8 kHz, whereas the effect of this fluid layer on the Stoneley dispersion becomes more pronounced as the frequency increases as shown in FIG. 7.

Figure 9A:
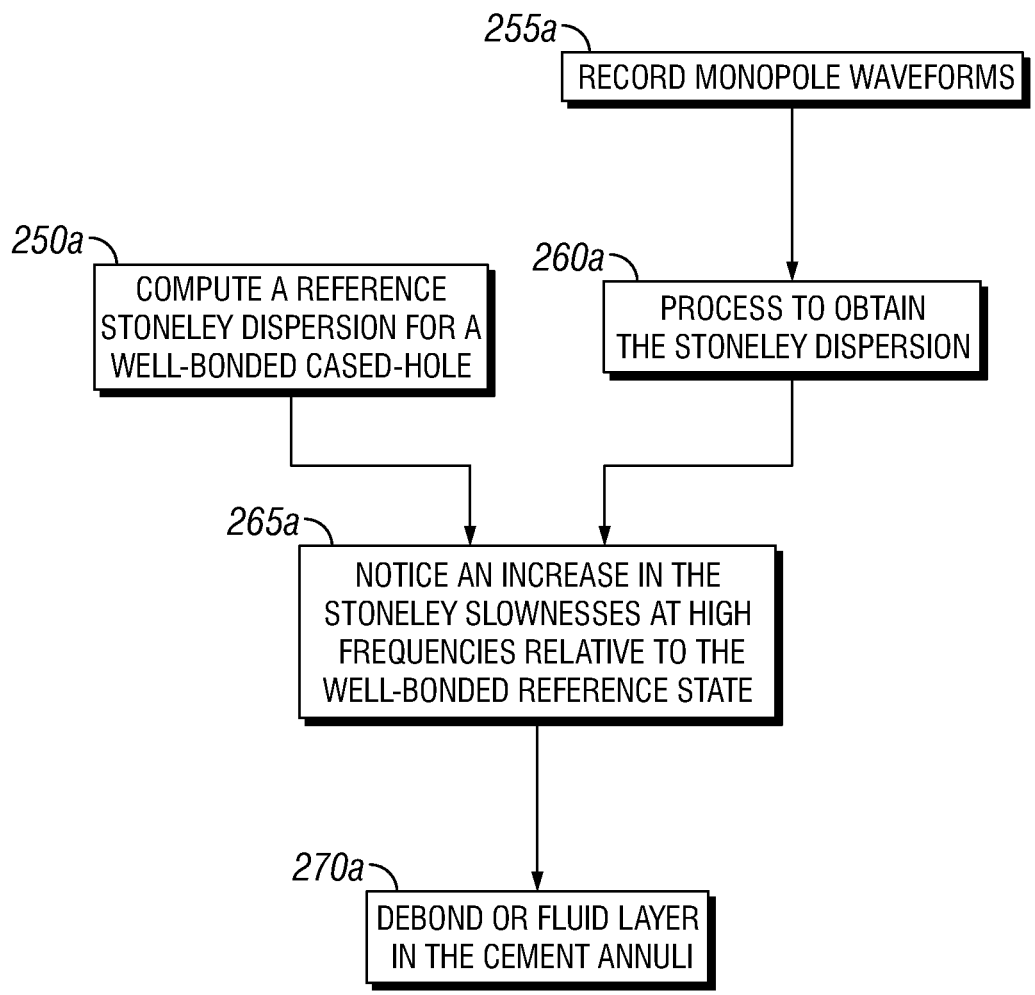
FIG. 9a is a flow chart of a method of detecting debond or fluid layers in the cement annulus/annuli of a borehole having a concentrically placed single casing or double steel casings using monopole waveforms generated by a sonic tool.

In one aspect, based on the results of FIGS. 2, 5, and 7 a method of detecting debonding or a fluid layer in the cement annulus/annuli of single or double steel cased borehole is provided in FIG. 9a. At 250a, a reference Stoneley dispersion for a well-bonded cased-hole borehole corresponding to a borehole of interest is computed. At 255a, monopole waveforms are recorded using a monopole sonic tool with multiple receivers in the cased borehole of interest. At 260a, the monopole waveforms recorded by the multiple receivers are processed to obtain the Stoneley dispersion. At 265a the processed Stoneley dispersion from 260a is compared to the reference Stoneley dispersion from 255a, particularly at frequencies of at least 2 kHz for double cased boreholes. At 270a, if the Stoneley slownesses of the computed Stoneley dispersion at the frequency or frequencies of interest are significantly greater (greater than a predetermined threshold value) than the slownesses of the reference at that frequency or frequencies, a determination is made that there is debonding or that a fluid layer is present in or outside at least one cement annulus. Equivalently, a determination may be made that the Stoneley slownesses of the reference are significantly lower than the computed Stoneley slownesses in order to find debonding or the presence of a fluid layer. It should be noted that for purposes herein, a comparison of slownesses is intended to include a comparison of velocities (of which slownesses are the inverse).

Figure 9B:
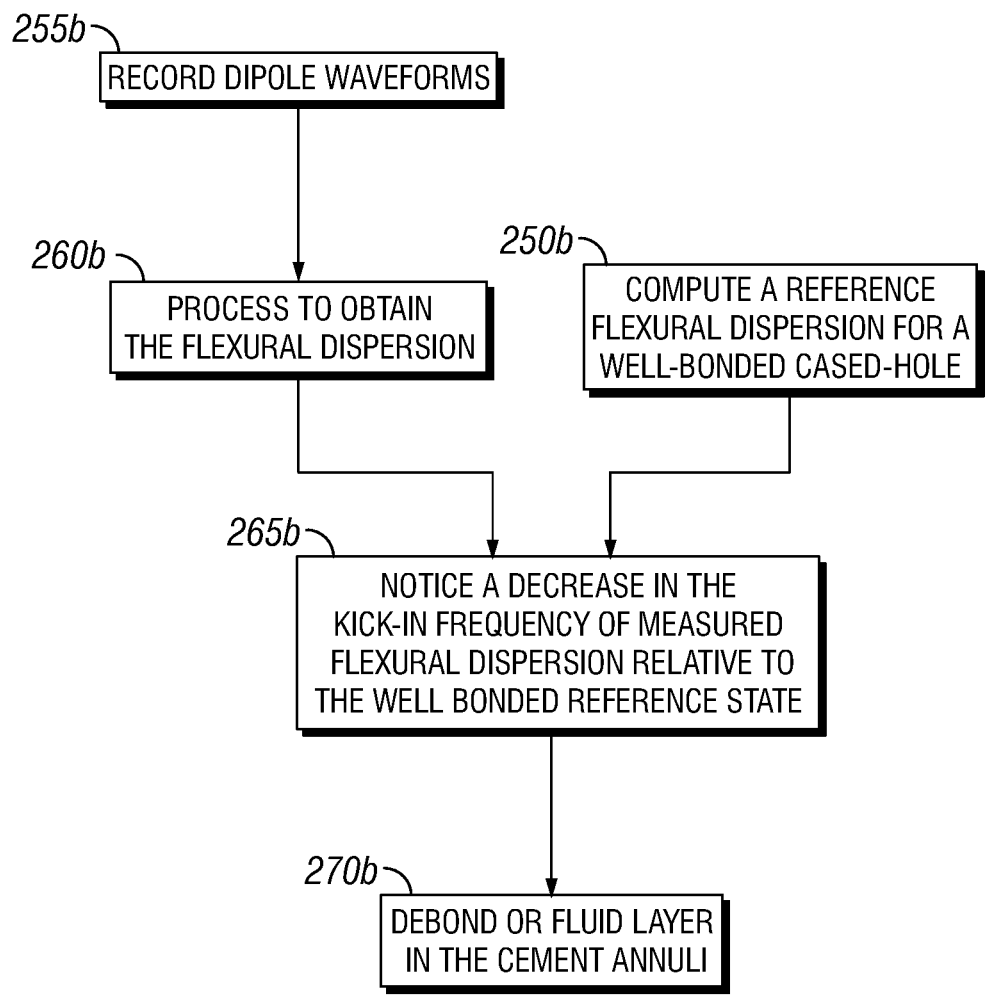
FIG. 9b is a flow chart of a method of detecting debond or fluid layers in the cement annulus/annuli of a borehole in a concentrically placed single casing or double steel casings using dipole flexural waveforms generated by a sonic tool.

In one aspect, based on the results of FIGS. 3, 6, and 8, a method of detecting debonding or a fluid layer in the cement annulus/annuli of single or double steel cased borehole is provided in FIG. 9b. At 250b, a reference flexural dispersion with a kick-in frequency for a well-bonded cased-hole borehole corresponding to a borehole of interest is computed. At 255b, dipole waveforms are recorded using a dipole sonic tool in the cased borehole of interest. At 260b, the dipole waveforms are processed to obtain the flexural dispersion with a kick-in frequency. At 265b the kick-in frequency of the flexural dispersion 260b obtained from the processed waveforms is compared to the kick-in frequency of the reference flexural dispersion from 250b, and if the kick-in frequency of the reference flexural dispersion is significantly higher (greater than a predetermined threshold value), a determination is made at 270b that there is debonding or that a fluid layer is present in or outside at least one cement annulus. Equivalently, a determination may be made that the kick-in frequency of the computed flexural dispersion 260b is significantly lower than the kick-in frequency of the reference in order to find debonding or the presence of a fluid layer.

According to another embodiment, rather than comparing the kick-in frequencies, the flexural dispersion slownesses obtained at 250b and 260b may be compared at desired frequencies, and if the computed flexural dispersion slownesses of 260b are greater than the reference flexural dispersion slownesses of 250b, a determination is made at 270b that there is debonding or that a fluid layer is present in or outside at least one cement annulus. Again, equivalently, a determination may be made that the reference slownesses are less than the computed slownesses in order to determine that there is debonding or that a fluid layer is present. Moreover, as previously suggested, a comparison of slownesses is intended to include a comparison of velocities (of which slownesses are the inverse).

According to one aspect, modeling results for a variety of bonds at steel/cement or cement/formation interfaces were obtained from root finding mode-search routines and from 3D cylindrical finite-difference codes with perfectly matched boundary conditions. In addition, borehole sonic responses were analyzed in the presence of fluid layers and channels of different thicknesses ranging from 100 microns to a several millimeters. Table 2 contains a listing of the inner and outer diameters of the inner and outer casings together with the borehole diameter used in the modeling and borehole sonic response analysis.

TABLE 2

Steel casing and borehole parameters

| Cylindrical element | Inner diameter | Outer diameter |
|---|---|---|
| Inner casing | 6.366 in (16.1696 cm) | 7.000 in (17.78 cm) |
| Outer casing | 8.755 in (22.2377 cm) | 9.625 in (24.4475 cm) |
| Borehole | 12 in (30.48 cm) | — |

According to one aspect, processing of monopole and dipole waveforms in the presence of double casings can yield multiple non-dispersive and dispersive arrivals that are supported by the propagating medium. In some embodiments, the arrivals present characteristic features (also called "signatures") depending upon the presence and nature of fluid layers or channels; i.e., cement related defects that can cause fluid communication between the reservoir and adjacent cap rocks. Some of these features can be observed either in the recorded waveforms and/or in frequency-slowness dispersions.

Turning now to FIGS. 10a-10f, six configurations of concentric casings in a formation with cement and/or water annuli are shown. In a partial schematic diagram, FIG. 10a ("case 1") shows a first configuration of a formation 310a with a water-filled borehole 315a, concentric casings 320a, 335a and water-filled annuli 330a, 337a (instead of cement annuli). FIG. 10b ("case 2") shows a diagram similar to FIG. 10a with a formation 310b, a water-filled borehole 315b, and concentric casings 320b, 335b, but with well-bonded cement annulus 330b between the casings 320b, 335b and a water-filled annulus between the outer casing 335b and the formation 310b. FIG. 10c ("case 3") shows a partial schematic diagram similar to FIGS. 10a and 10b with a formation 310c, a water-filled borehole 315c, concentric casings 320c, 335c, but with well-bonded cement annuli 330c, 337c. FIG. 10c may be referred to as the "reference" configuration. FIG. 10d ("case 4") shows a partial schematic diagram of a formation 310d with a water-filled borehole 315d, concentric casings 320d, 335d, cement annuli 330d, 337d, but with a linear-slip 339 that simulates a micro-annulus at an interface between the cement 337d and the outer surface of outer casing 335d. FIG. 10e ("case 5") is similar to FIG. 10d and shows a partial schematic diagram of a formation 310e with a water-filled borehole 315e, concentric casings 320e, 335e, cement annuli 330e, 337e, but with a linear-slip 339e that simulates a micro-annulus at an interface between the cement 330e and the inner surface of outer casing 335e. FIG. 10f ("case 6") is similar to FIGS. 10e and 10d and shows a partial schematic diagram of a formation 310f with a water-filled borehole 315f, concentric casings 320f, 335f, cement annuli 330f, 337f, but with a linear-slip 339f that simulates a micro-annulus at an interface between the cement 330f and the outer surface of the inner casing 320f.

Figure 11A:
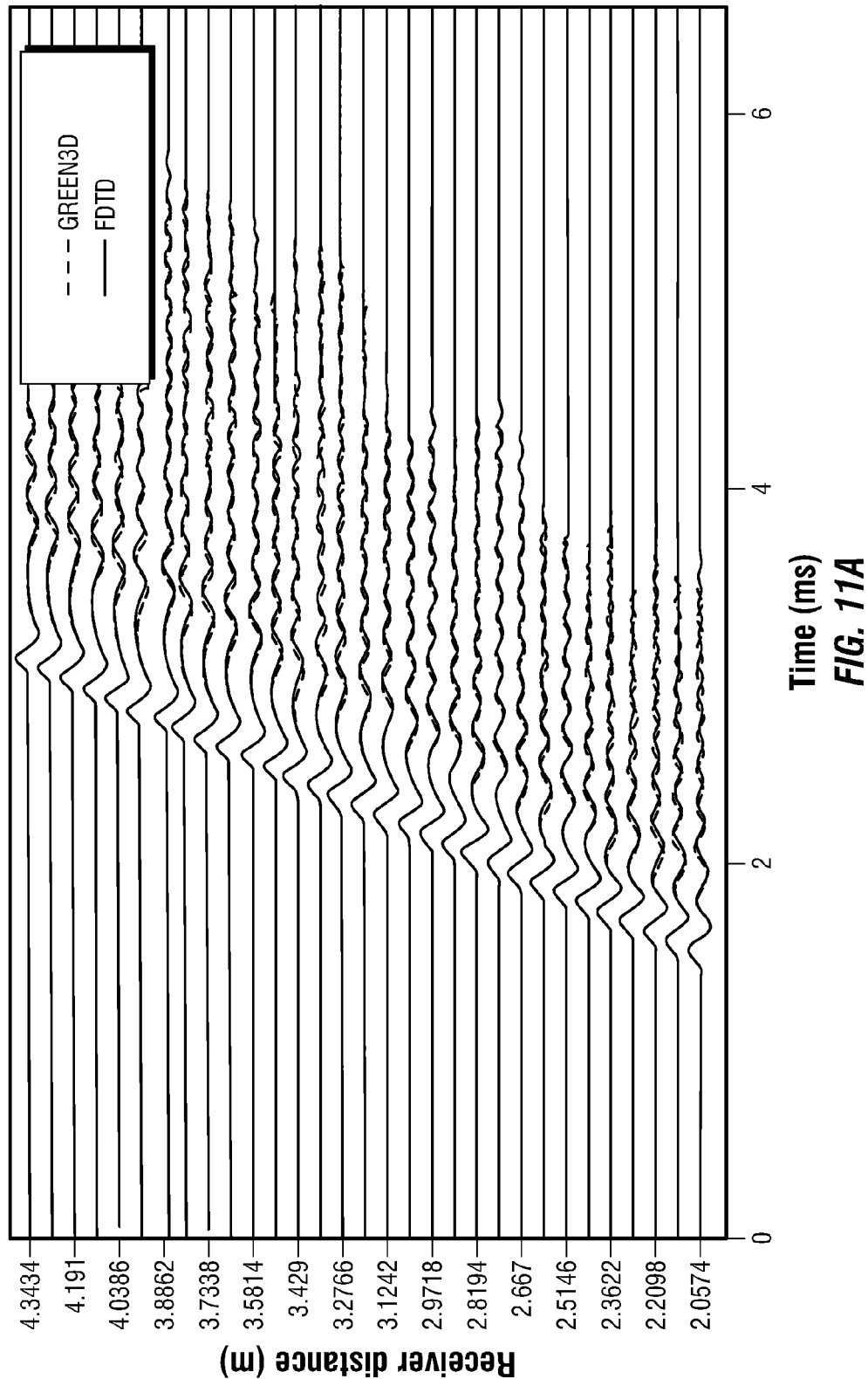
FIGS. 11a-11f are synthetic waveform plots showing respectively synthetic waveforms generated by a monopole source on the borehole axis for the configurations shown in FIGS. 10a-10f.
Figure 11B:
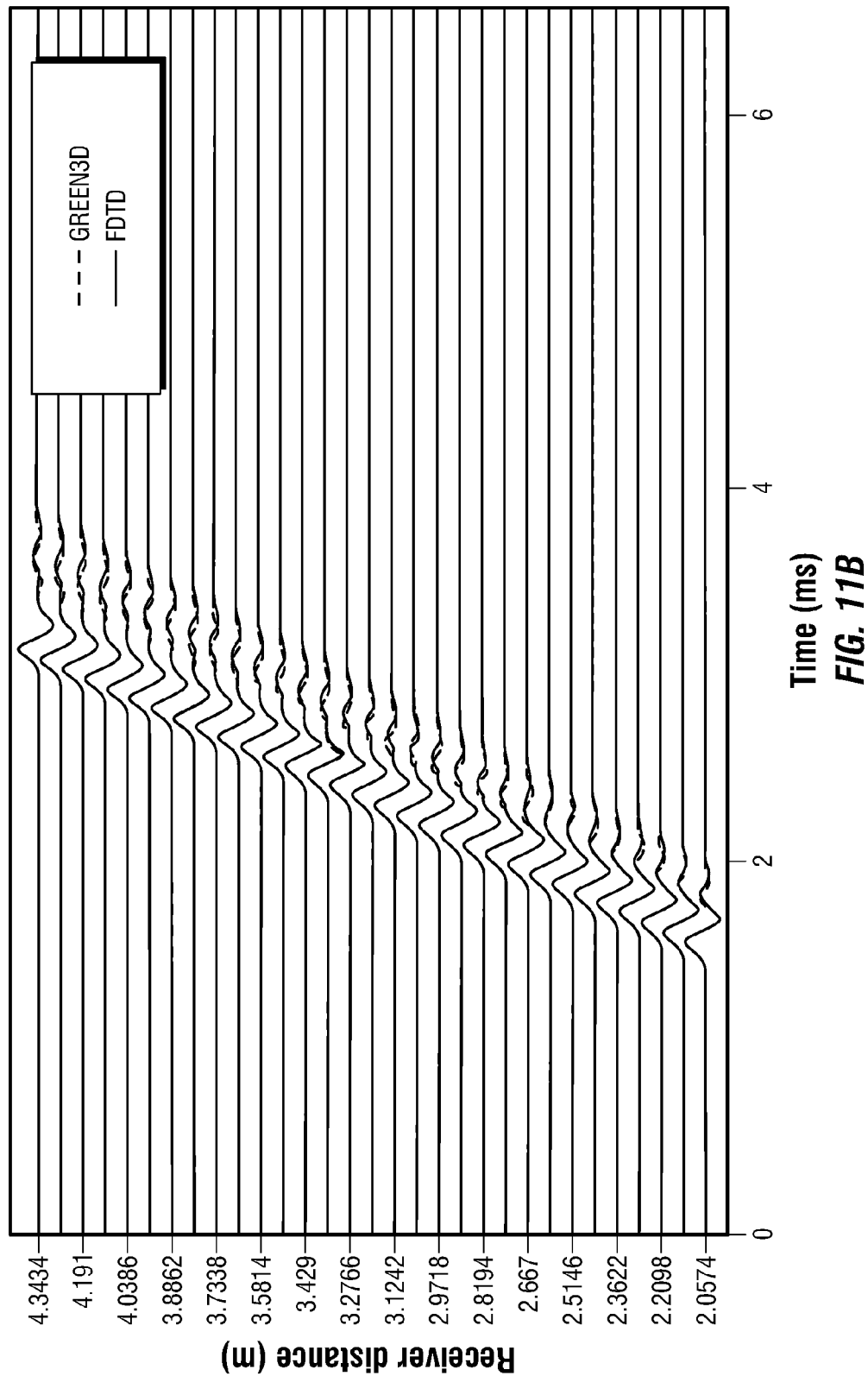
Figure 11C:
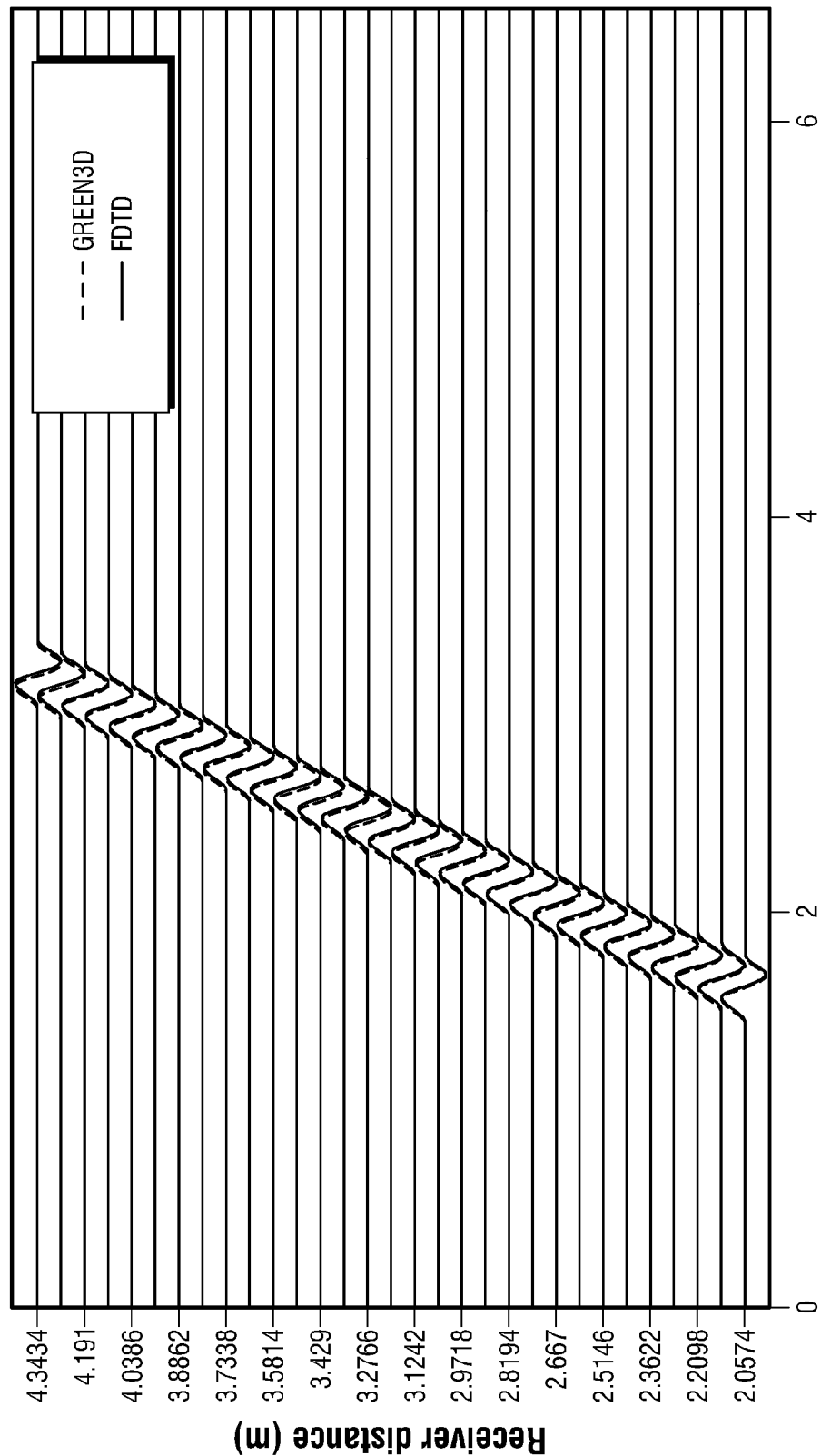
Figure 11D:
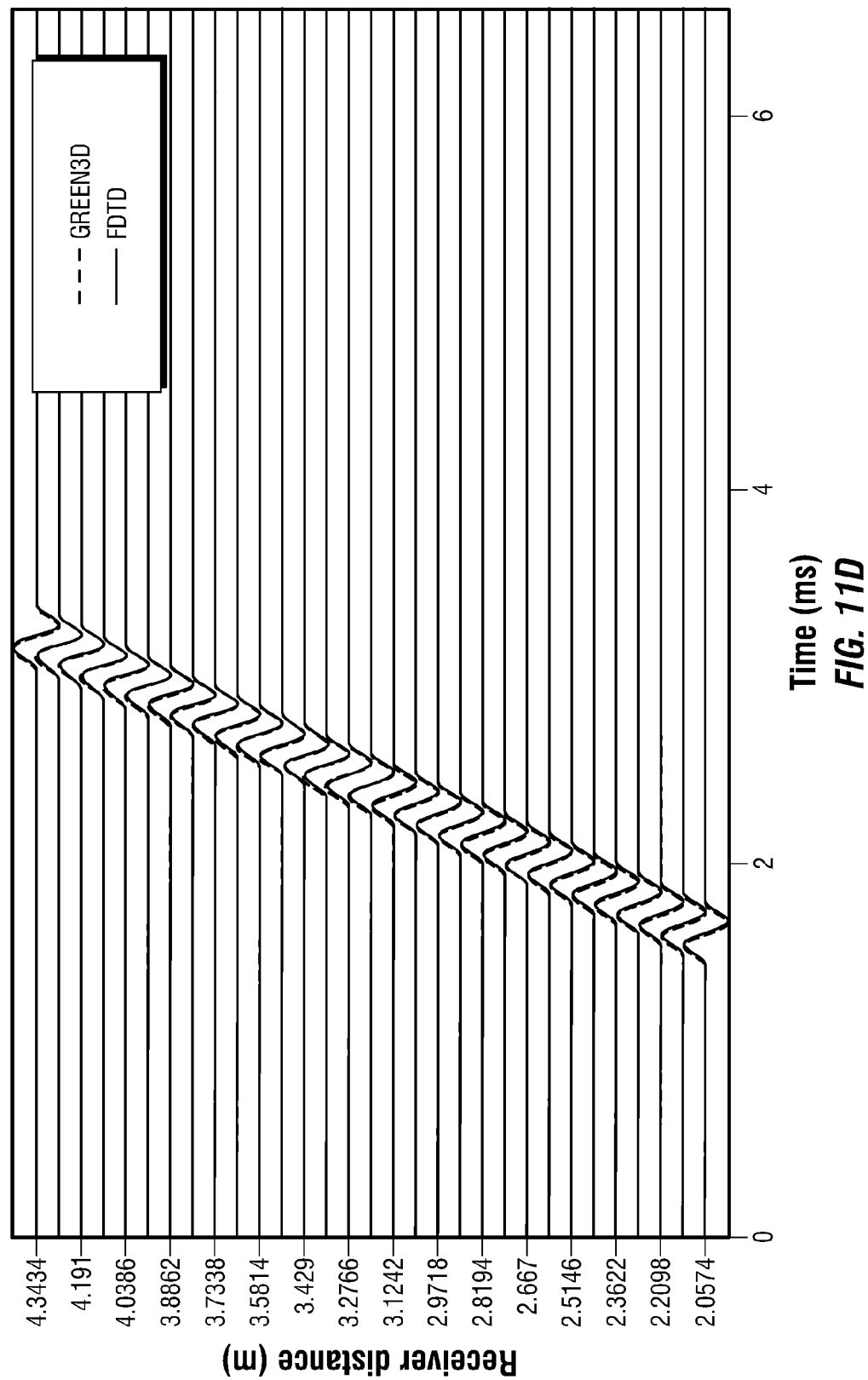
Figure 11E:
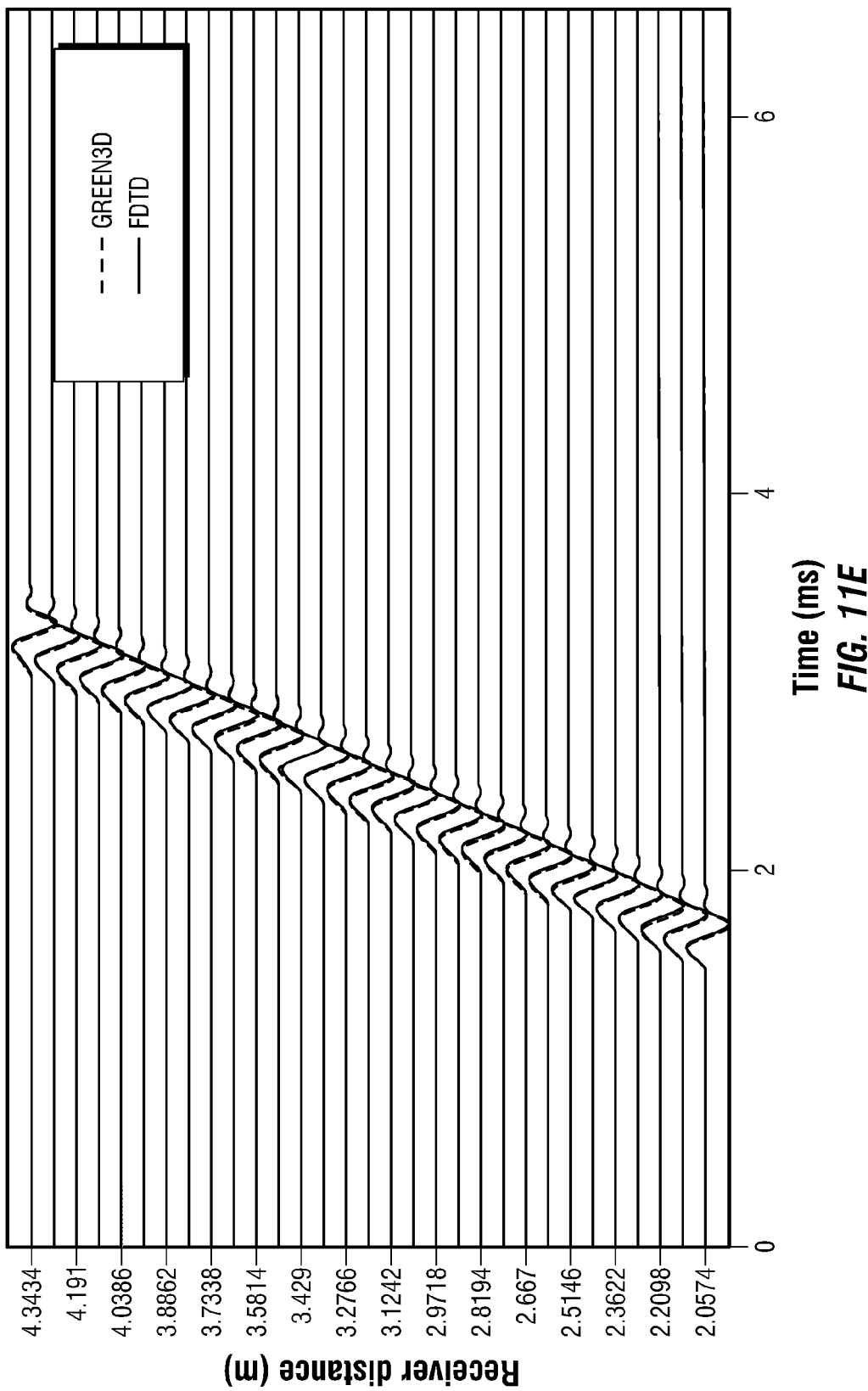
Figure 11F:
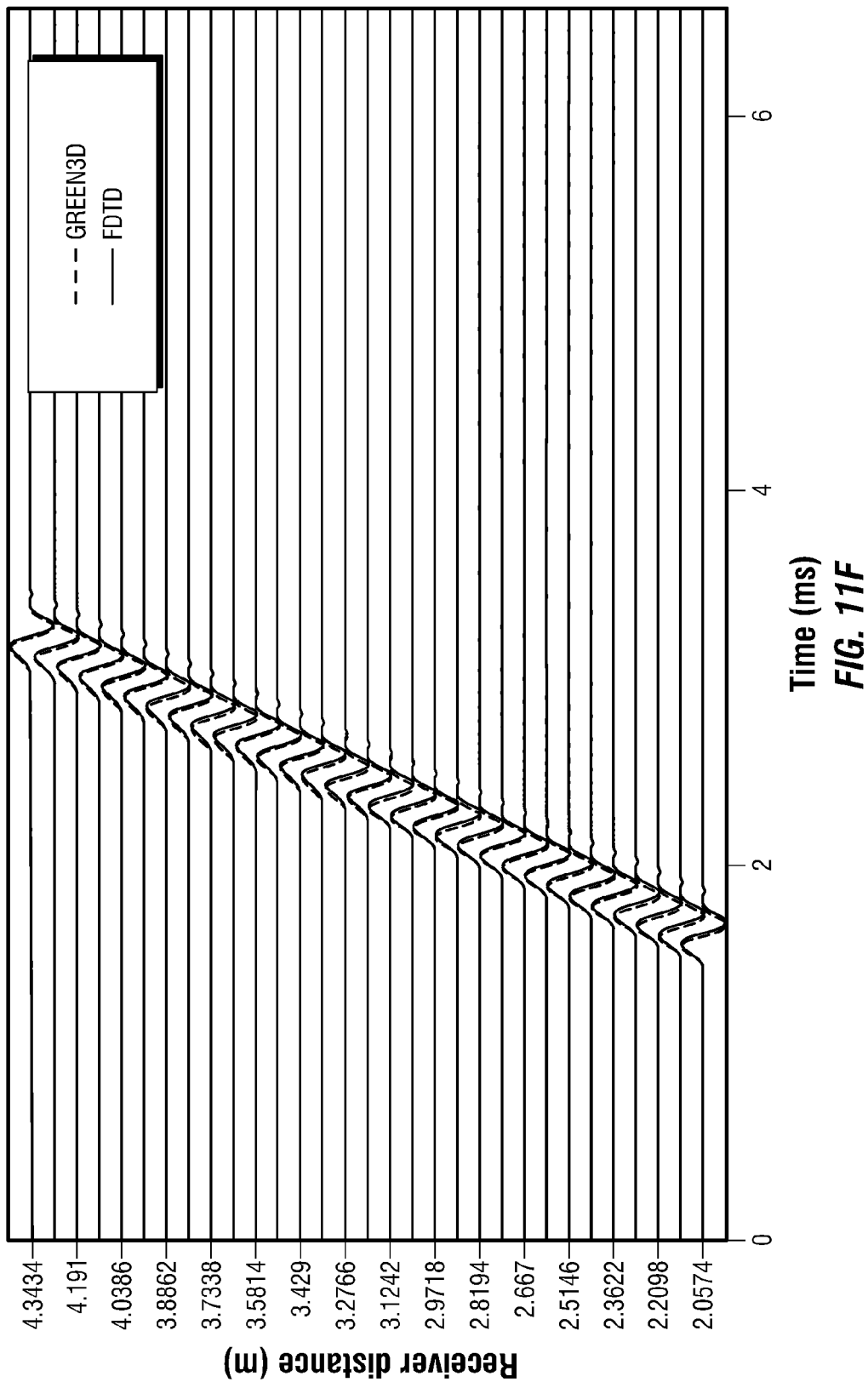

FIG. 11a shows synthetic waveforms generated by a monopole source on the borehole axis for the arrangement of FIG. 10a where water-filled annuli 330a, 337a are present. FIG. 11b similarly shows synthetic waveforms generated by a monopole source on the borehole axis for the arrangement of FIG. 10b where a cement annulus 330b is present between the casings, and a water annulus 337b is present outside the outer casing. FIG. 11c depicts synthetic monopole waveforms in the well-bonded reference configuration of FIG. 10c. Similarly, FIGS. 11d-11f show synthetic waveforms generated by a monopole source on the borehole axis for the arrangements of FIGS. 10d-10f which include cement annuli with a linear slip located in three different locations. In comparing FIGS. 11a, 11b, and 11d-11f with the reference FIG. 11c, it will be appreciated that FIG. 11a and to some extent FIG. 11b shows extended ringing in the waveforms relative to the waveform of FIG. 10c.

Figure 12F:
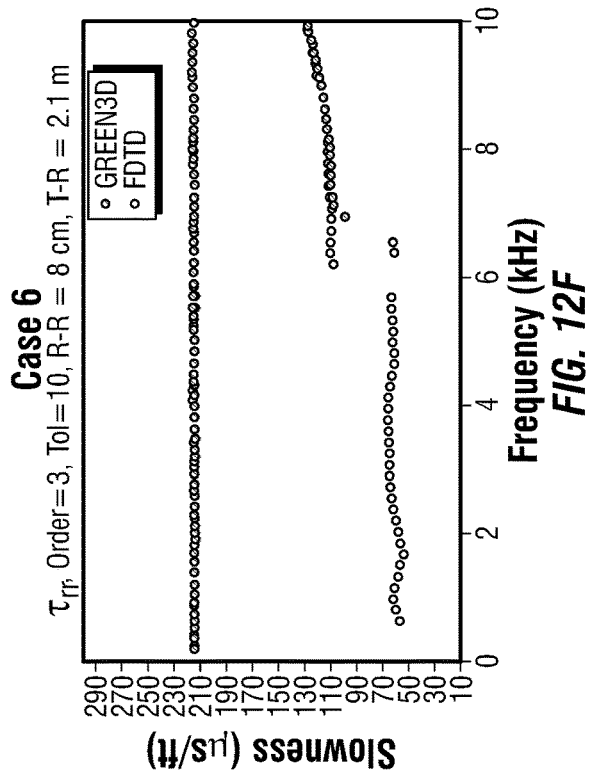

The monopole waveforms of FIGS. 11a-11f may be processed to obtain dispersion plots provided in FIGS. 12a-12f by using various techniques such as a modified matrix pencil algorithm. See, e.g., Ekstrom, M.E., "Dispersion Estimation from Borehole Acoustic Arrays Using a Modified Matrix Pencil Algorithm," 29$^{th}$ *Asilomar Conf Signals Systems and Computing*, Pacific Grove, Calif., Oct. 31, 1995, which is also known as TKO. The dispersion plot of FIG. 12a (which relates to the arrangement of FIG. 10a with two water annuli—"case 1") depicts a dual Stoneley dispersion, one dispersion that is relatively constant at just above 210 μs/ft, and one dispersion that changes as a function of frequency, starting at about 290 μs/ft at 1 kHz, dropping quickly therefrom to about 250 μs/ft at about 2 kHz, staying relatively constant at 250 μs/ft in the range of 2 kHz to 4 kHz, and increasing slowly back to 290 μs/ft from 4 kHz to 7 kHz. FIG. 12b (which relates to the arrangement of FIG. 10b with an inner cement annulus and an outer water annulus) depicts a dual Stoneley dispersion with one Stoneley dispersion that is relatively constant at just above 210 μs/ft and one that is relatively constant at about 250 μs/ft, and a casing extension dispersion that is relatively constant at a slowness of approximately 60 us/ft from 1 kHz to 7 kHz. The dispersion plot of FIG. 12c relates to the well-cemented reference arrangement of FIG. 10c, and shows a single Stoneley dispersion that is substantially constant at or just under 210 μs/ft and a pseudo-Rayleigh dispersion that is relatively constant at about 100 μs/ft from 1 kHz to 10 kHz.

In one aspect, it is instructive to compare the dispersion plots of cases 1 and 2 where one or both annuli contain water, to the dispersion plot of case 3 where both annuli are well-cemented, as differences between these dispersion signatures are indicators of imperfect cement annuli that might result in fluid communication behind the casing. As will be appreciated, one relatively evident difference between the dispersions of FIGS. 12a and 12b and that of FIG. 12c is that both FIGS. 12a and 12b contain dual Stoneley dispersions, whereas FIG. 12c contains a single Stoneley dispersion. In addition, the slowness of the Stoneley dispersion of FIG. 12c is slightly slower (i.e., a lower slowness value) than the slower Stoneley slowness dispersions of FIGS. 12a and 12b. Another evident difference is that FIG. 12c includes a pseudo-Rayleigh dispersion at a slowness slower than the Stoneley dispersion that is not present in either of FIGS. 12a and 12b. Moreover, a difference is apparent between cases 1 and 2 (FIG. 12a and FIG. 12b) in that FIG. 12b shows a casing extension mode dispersion (which is slower than the pseudo-Rayleigh dispersion of FIG. 12c) while FIG. 12a does not reveal that dispersion.

Figure 12E:
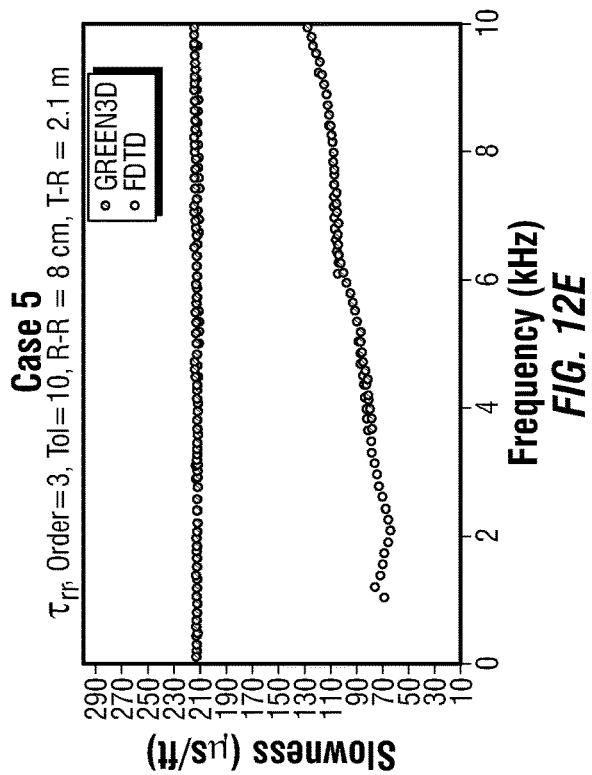

The dispersion plots of FIGS. 12d, 12e and 12f which relate to arrangements having cement annuli but with a water microannulus at different locations are all quite similar. Each contains a Stoneley dispersion at a slowness of just above 210 μs/ft, and at frequencies below 5 kHz, none contain the pseudo-Rayleigh dispersion (at a slowness of approximately 100 μs/ft). In addition, each contains a casing extensional mode that appears at frequencies between 1 kHz up to 5 kHz. In case 4 (FIG. 12d), the casing extensional mode has a slowness of between approximately 60 and 80μs/ft at frequencies of between 1 kHz and 5 kHz. In case 5, the casing extensional mode has a slowness of between approximately 70 and 90 in the same frequency range, whereas in case 6, the casing extensional mode slowness is relatively constant at about 60 60 μs/ft in that frequency range. Above 6 kHz, each of the three cases exhibits a dispersion that increases from approximately 110 to 130 μs/ft and which may also be interpreted as part of the casing extensional mode.

The dispersion plots of FIGS. 12d-12f may be compared to the reference dispersion plot of FIG. 12c. Differences between these dispersion signatures are indicators of an imperfect cement annulus, e.g., a microslip at the interface between one of the casings and one of the cement annuli. One evident difference is that none of the plots of FIGS. 12d-12f contain a pseudo-Rayleigh dispersion at a relatively constant slowness of approximately 100 μs/ft in the frequency range of 1 kHz to 5 kHz, or even in the range of 1 kHz to 10 kHz. Rather, each contains a casing extensional mode at a lower slowness from 1 kHz to 5 kHz, and an increasing slowness from 110 to 130 μs/ft in the frequency range of 6 kHz to 10 kHz. Additionally, the slowness of the Stoneley dispersion of FIG. 12c is slightly slower (i.e., a lower slowness value) than the slower Stoneley slowness dispersions of FIGS. 12d-12f.

Figure 13A:
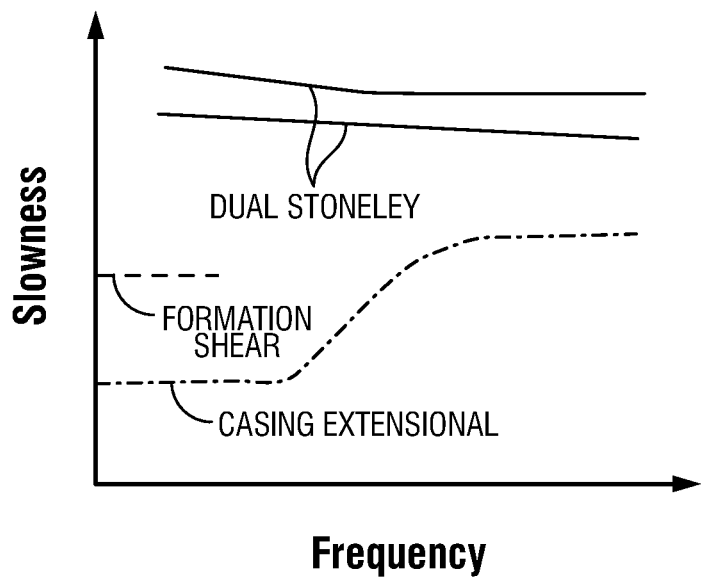
FIGS. 13a and 13b are slowness versus frequency graphics, with FIG. 13a representing monopole dispersions in the presence of steel casings where fluid annuli are present such that dual Stoneley and casing extensional modes are present, and FIG. 13b representing a reference well-bonded casedhole geometry where monopole Stoneley and pseudo-Rayleigh mode dispersions are shown.
Figure 13B:
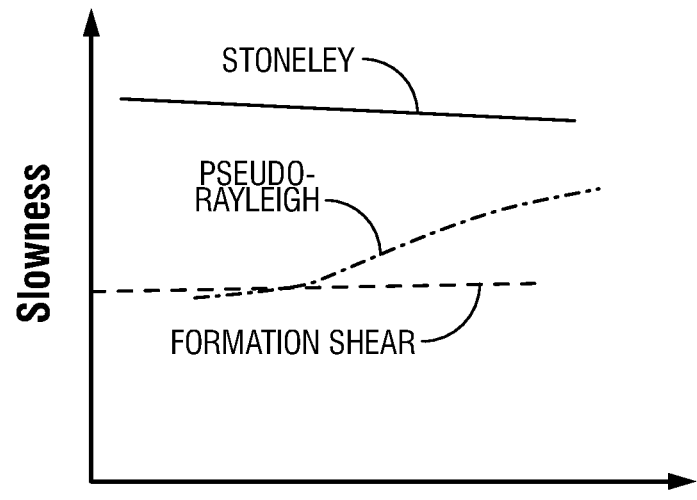

Turning to FIG. 13a, a graphic is seen of monopole dispersions depicting results in a double steel casing with a fluid annulus on the inner surface of the outer casing and another fluid annulus between the outer casing and the formation. FIG. 13a is substantially similar to FIG. 12b but over a larger frequency range and shows a dual Stoneley mode dispersion, a casing extensional mode dispersion, and a formation shear wave. For reference, FIG. 13b is a schematic similar to FIG. 12c but over a larger frequency range and shows the monopole Stoneley (solid line) and pseudo-Rayleigh mode (dot-dash) dispersions that are obtained in the presence of a reference well-bonded casedhole geometries, and a reference shear wave dispersion (dashed).

Figure 14:
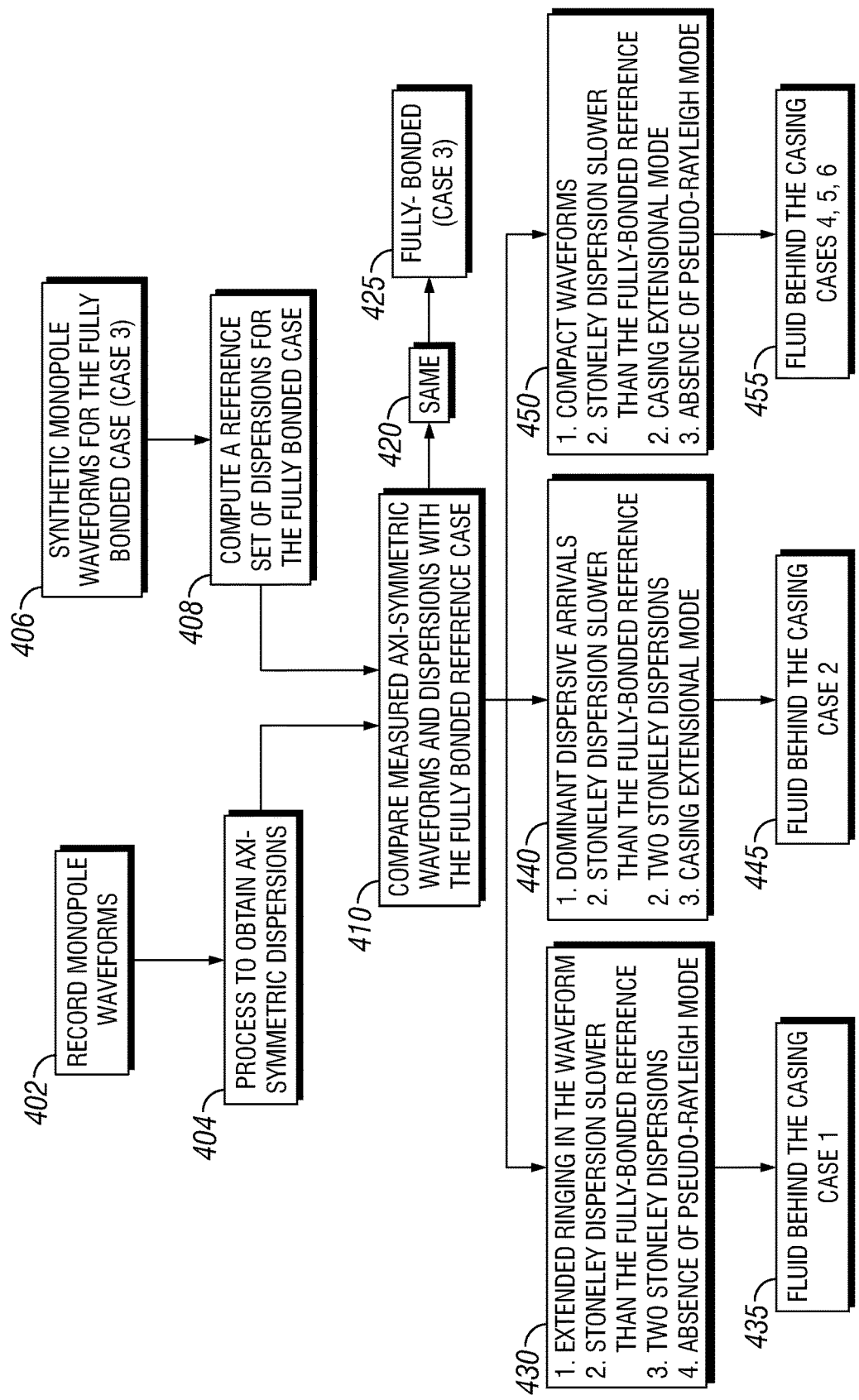
FIG. 14 is a flow chart of a method of detecting debond or fluid layers specifics in the cement in the cement annulus/annuli of a borehole having a concentrically placed single casing or double steel casings using signature results from monopole waveforms generated by a sonic tool.

In one embodiment, a method of detecting fluid annuli and/or debonding of a cement annulus from a casing of a double-cased borehole is shown in FIG. 14. Thus, at 402, a sonic tool with a monopole source and a plurality of receivers is placed in the borehole (wellbore) of interest and activated such that monopole waveforms are generated by the source and recorded by the receivers. The recorded waveforms may be similar to one of those shown in FIGS. 11a-11f. At 404, the monopole waveforms are processed to obtain dispersion plots, e.g., by using various a modified matrix pencil algorithm such as TKO as previously described or other processing known in the art. In one embodiment, and as disclosed hereinafter, axi-symmetric waveforms are chosen to generate axi-symmetric dispersions. At 406 synthetic monopole waveforms for the ideal fully-bonded (reference) borehole ("case 3") corresponding to the borehole of interest is generated using an appropriate modeling tool. The modeling tool will generally account for the diameters of the casings, the thicknesses of the cement annuli, elastic properties (expressed by Lame constants, λ and μ) and mass densities of the borehole fluid, casing material, cement, and formation, and the waveforms may take a form similar to FIG. 11c. At 408, a reference set of dispersions for the full-bonded borehole are generated using TKO or other processing. This reference set of dispersions may take a form similar to FIG. 12c. At 410, in one embodiment, the dispersion plots obtained at 404 are compared to the reference plots of 408 over a desired frequency range such as 0-10 kHz. In another embodiment, both the waveforms and the dispersion plots are compared. If the dispersion plots are essentially identical, with a single Stoneley dispersion and a pseudo-Rayleigh mode dispersion in the frequency range of interest at 420, it is determined at 425 that the borehole of interest has two cement annuli that are fully bonded to the casings (case 3) at the location at which the waveforms were obtained. If, on the other hand, if there are two Stoneley dispersions and/or the absence of the pseudo-Rayleigh mode dispersion, then the borehole of interest is identified as not having fully-bonded cement annuli at that location.

More particularly, if two Stoneley dispersions are present and there is no pseudo-Rayleigh mode (and no casing extensional mode dispersion) at 430, it may be concluded at 435 that there is fluid behind both casings (case 1). In one aspect, the conclusion of fluid behind both casings at the location of measurement may be confirmed by the presence of a Stoneley dispersion that is slower (i.e., a higher slowness value) than the fully-bonded reference. In another aspect, the conclusion of the existence of fluid behind both casings may be confirmed by determining that the waveforms obtained at 402 have extended ringing relative to the waveforms of 406.

Similarly, if two Stoneley dispersions are present and there is a casing extensional mode dispersion (and no pseudo-Rayleigh mode dispersion) at 440, it may be concluded at 445 that there is a good cement annulus between the casings but that there is fluid behind the outer casing (case 2). In one aspect, the conclusion of the existence of fluid behind the outer casing at the location of measurement may be confirmed by the presence of a Stoneley dispersion that is slower (i.e., a higher slowness value) than the fully-bonded reference. In another aspect, the conclusion of fluid behind the outer casings at the location of measurement may be confirmed by determining that the waveforms obtained at 402 have two dominant arrivals (whereas the waveforms of fully bonded arrangement have a single dominant arrival). It is noted that a casing extensional mode dispersion may be identified by being significantly faster (i.e., a lower slowness value) than the pseudo-Rayleigh dispersion. In some cases it may also be identified as having a significantly changing slowness as a function of frequency, whereas the pseudo-Rayleigh mode dispersion is generally more constant between 1 kHz and 8 kHz.

If the dispersions obtained at 404 and compared at 410 have only a single Stoneley dispersion but have a casing extensional mode dispersion rather than a pseudo-Rayleigh mode dispersion at 450, it may be concluded at 455 that there are two cement annuli but that there is a micro-annulus (debonding) between a casing and one of the cement annuli (case 4, case 5 or case 6). In one aspect, the conclusion of the existence of a micro-annulus may be confirmed by a Stoneley dispersion that is slower than the fully-bonded reference. In another aspect, the presence and specifics of a casing extensional mode dispersion may be used to distinguish amongst cases 4, 5, and 6 based on their slightly different signatures.

In one embodiment, the dispersions obtained at 404 and the dispersions computed at 408 are plotted on a single graph (as in FIG. 5) with different indicia (e.g., different colors or dots versus squares) that may be visually inspected for similarities and differences. In another embodiment, the dispersions obtained at 404 and the dispersions computed at 408 are plotted on different graphs (as in FIGS. 12*c* and any of FIGS. 12*a*, 12*b*, 12*d*, 12*e* and 12*f*) that may be visually inspected side by side for similarities and differences. In another embodiment, the dispersions obtained at 404 and the dispersions computed at 408 are compared by a processor that provides a chart or other readable output of the differences. In all embodiments, the comparison of the dispersions obtained at 404 and at 408 may be conducted at multiple depths in the borehole.

According to one aspect, the monopole waveforms are recorded at multiple locations in the wellbore. If, after processing, dual Stoneley and/or casing extensional mode dispersions are found at a particular location, remedial action may be taken. Remedial action may include perforating one or both of the casings and injecting cement to fill an annulus or a micro-annulus. Remedial action may be important in order to permit hydrocarbon production without contaminating aquifers. Remedial action may also be important in preventing toxic gas from escaping from the formation into the atmosphere.

Figure 15A:
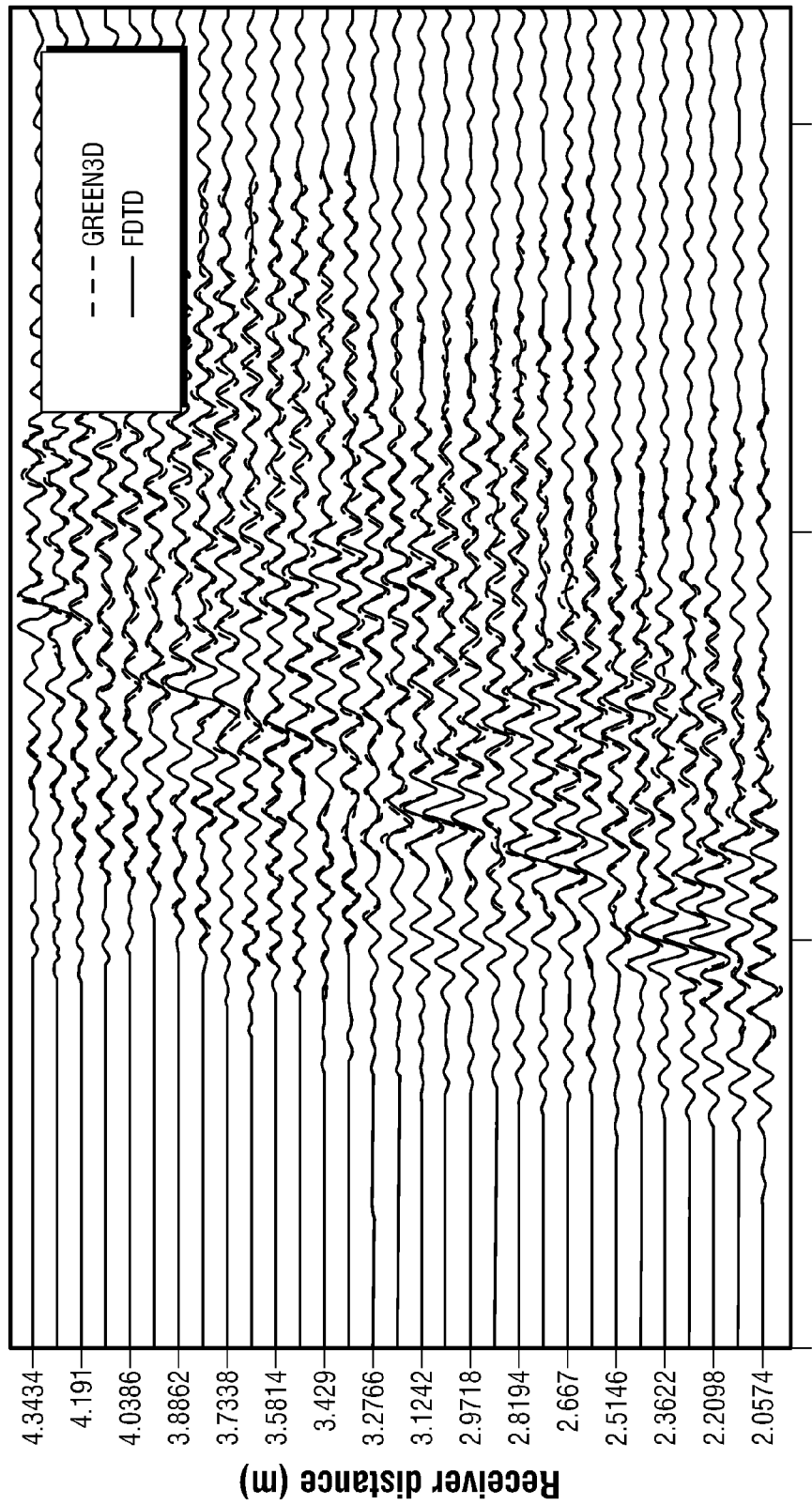
FIGS. 15a-15f are synthetic waveform plots showing respectively synthetic waveforms generated by a dipole source on the borehole axis for the configurations shown in FIGS. 10a-10f.
Figure 15B:
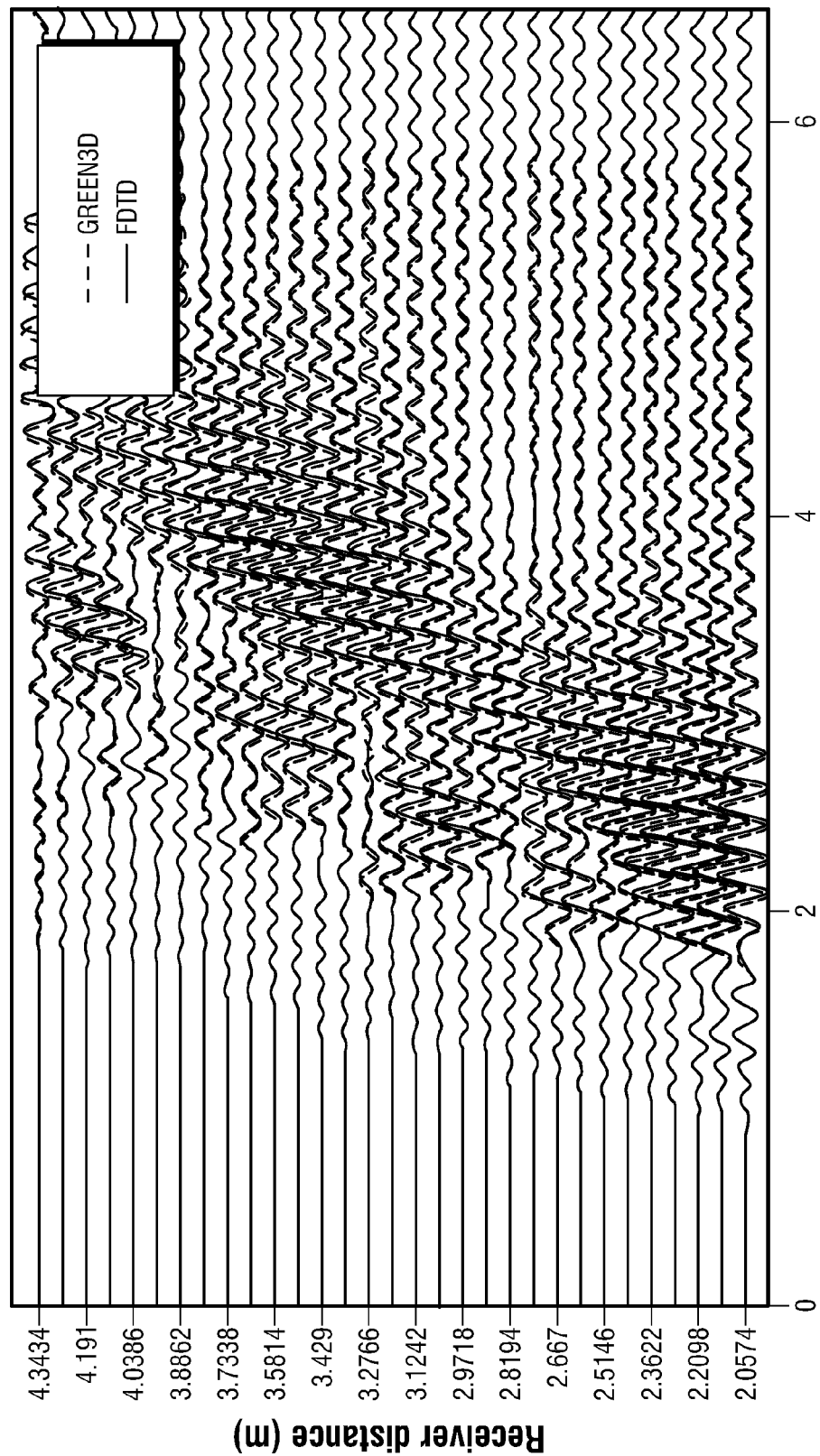
Figure 15C:
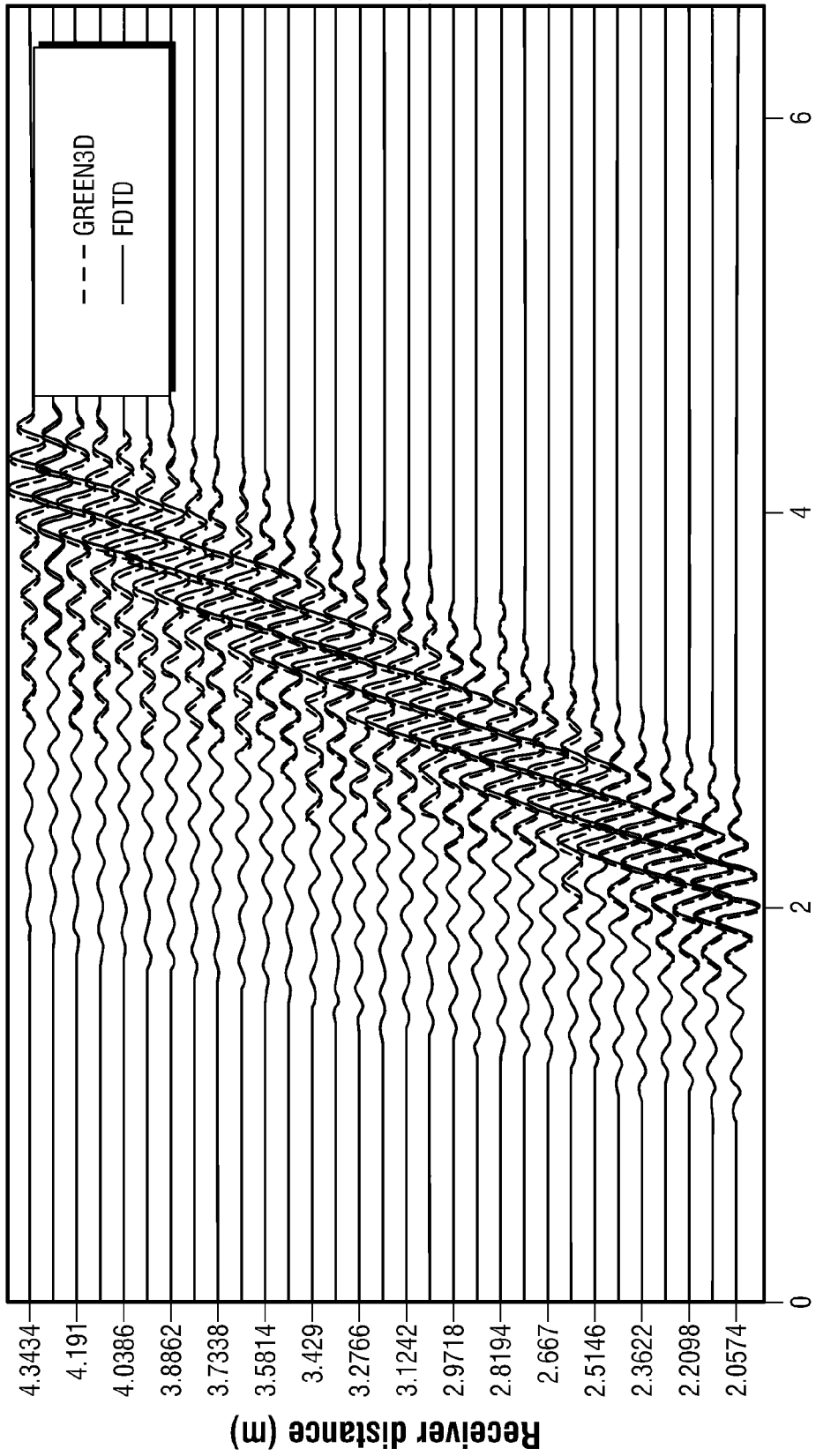
Figure 15D:
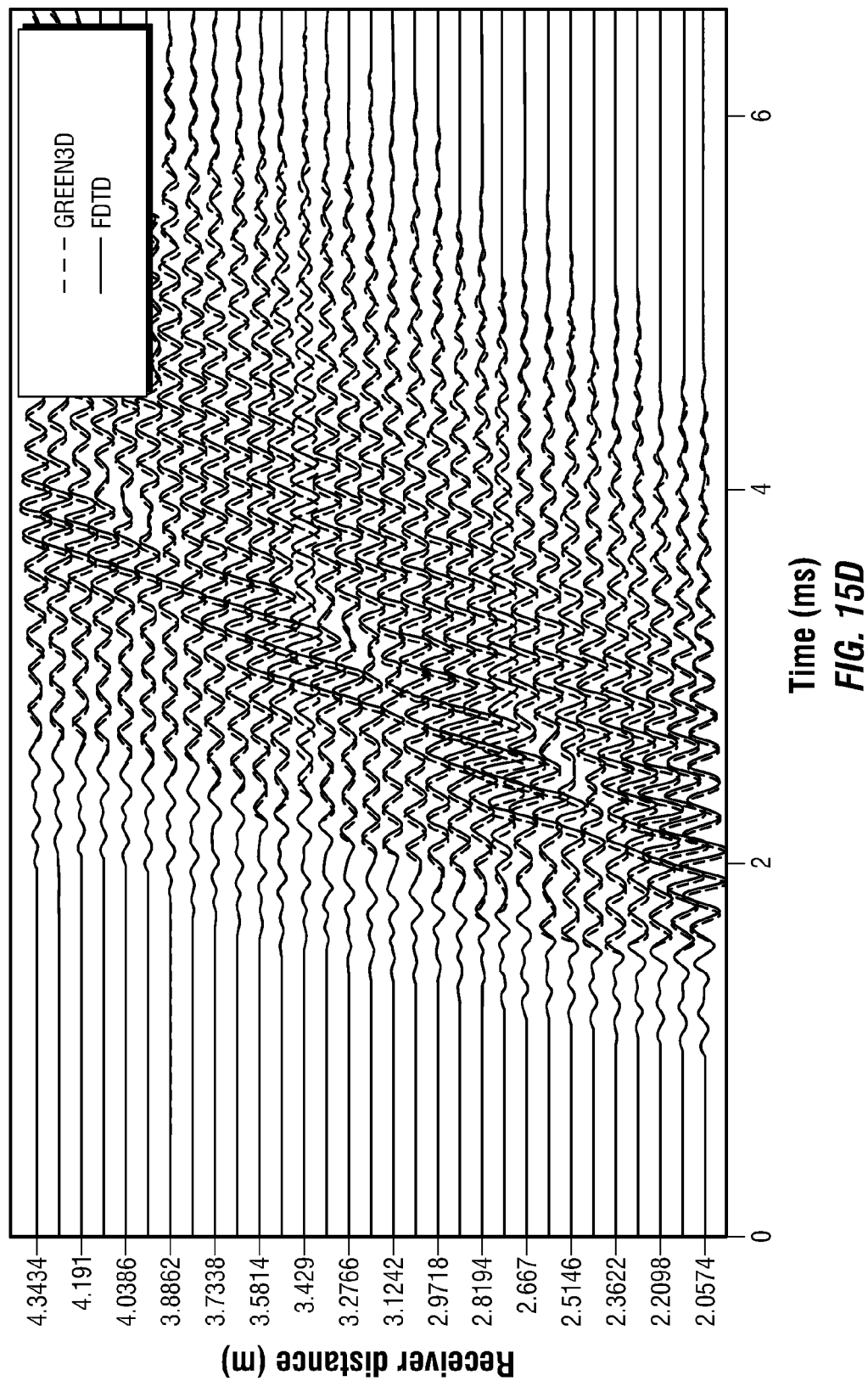
Figure 15E:
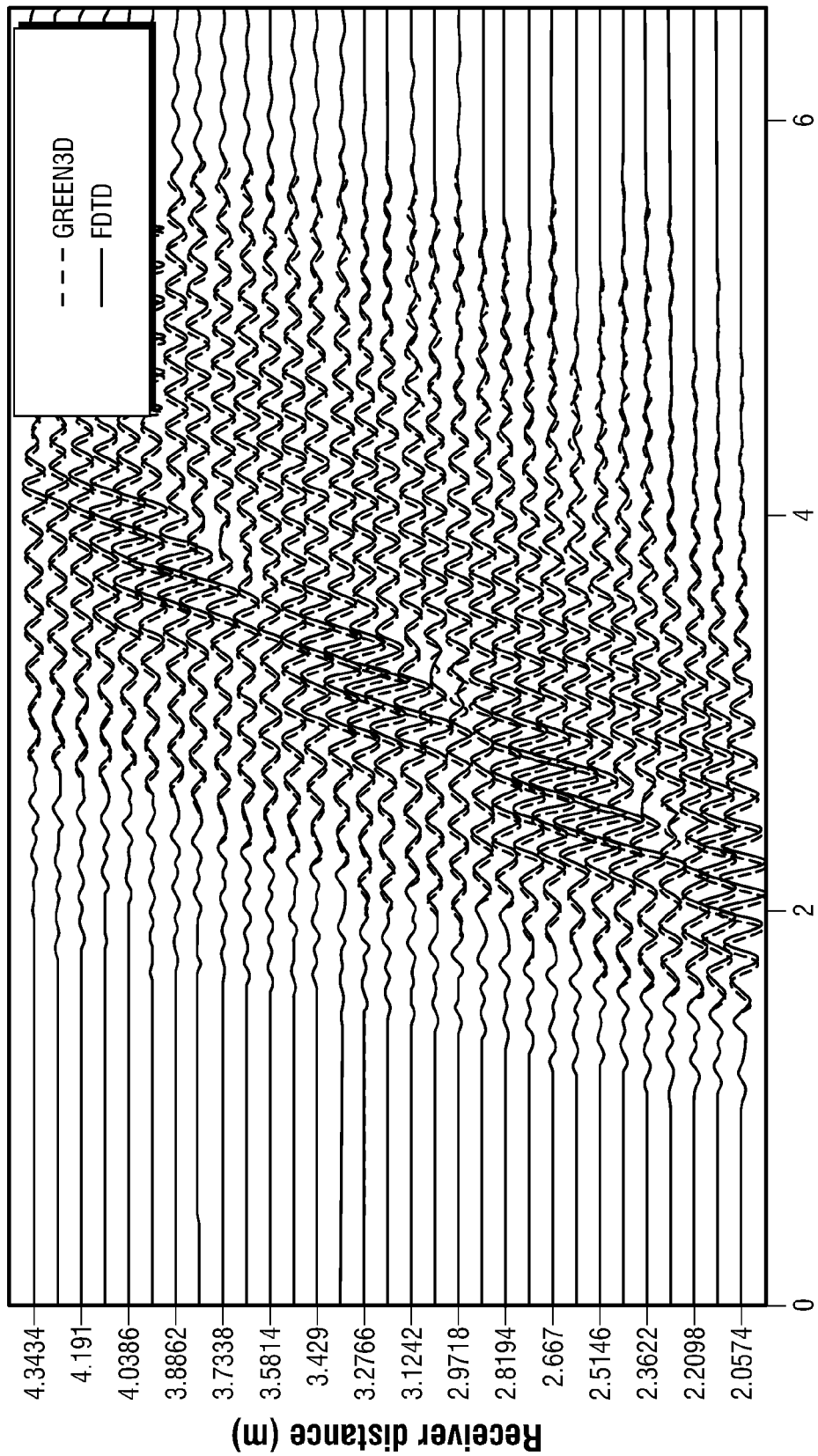
Figure 15F:
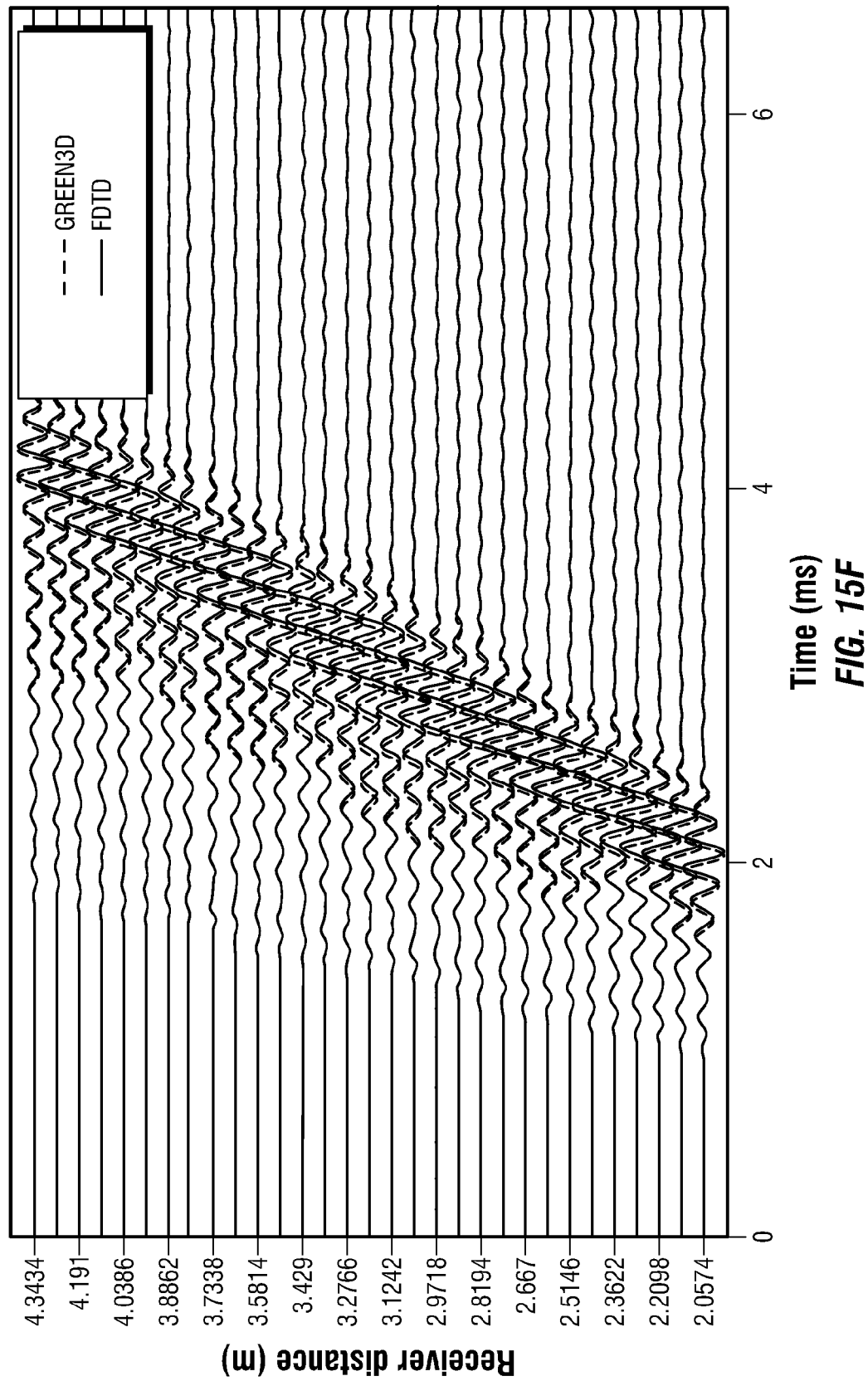

FIG. 15*a* shows synthetic waveforms generated by a dipole (flexural) source on the borehole axis for the arrangement of FIG. 10*a* where water-filled annuli 330*a*, 337*a* are present. FIG. 15*b* similarly shows synthetic waveforms generated by a dipole source on the borehole axis for the arrangement of FIG. 10*b* where a cement annulus 330*b* is present between the casings, and a water annulus 337*b* is present outside the outer casing. FIG. 15*c* depicts synthetic dipole waveforms in the well-bonded reference configuration of FIG. 10*c*. Similarly, FIGS. 15*d*-15*f* show synthetic waveforms generated by a dipole source on the borehole axis for the arrangements of FIGS. 10*d*-10*f* which include cement annuli with a linear slip located in three different locations. In comparing FIGS. 15*a*, 15*b*, and 15*d*-15*f* with the reference FIG. 15*c*, it will be appreciated that FIGS. 15*a* and 15*b* show significantly extended ringing in the waveforms relative to the waveform of FIG. 15*c* as well as modal interference. FIGS. 15*d* and 15*e* likewise show significantly extended ringing in the waveforms but no modal interference. Finally, FIG. 15*f* has no modal interference and reveals a slight extended ringing in the waveform relative to FIG. 15*c* that can be observed by subtracting the waveforms in FIG. 15*f* from those in FIG. 15*c*. Differences in the sonic signatures are more readily seen in the associated dispersion plots that are obtained by a processing of these waveforms as discussed below.

The dipole waveforms of FIGS. 15*a*-15*f* may be processed to obtain dispersion plots provided in FIGS. 16*a*-16*f* by using various techniques such as previously described TKO techniques, parametric inversion dispersive wave processing as described in U.S. Pat. No. 7,120,541 which is hereby incorporated by reference herein in its entirety, TKO processing as described in Lang et al., "Estimating Slowness Dispersion from Arrays of Sonic Logging Waveforms," Geophysics, Vol. 52, No. 4, April 1987, pp. 530-544, among others. As discussed hereinafter, the dispersion plots of cases 1-6 have significantly different signatures.

Figures 16A, 16B, 16C, 16D:
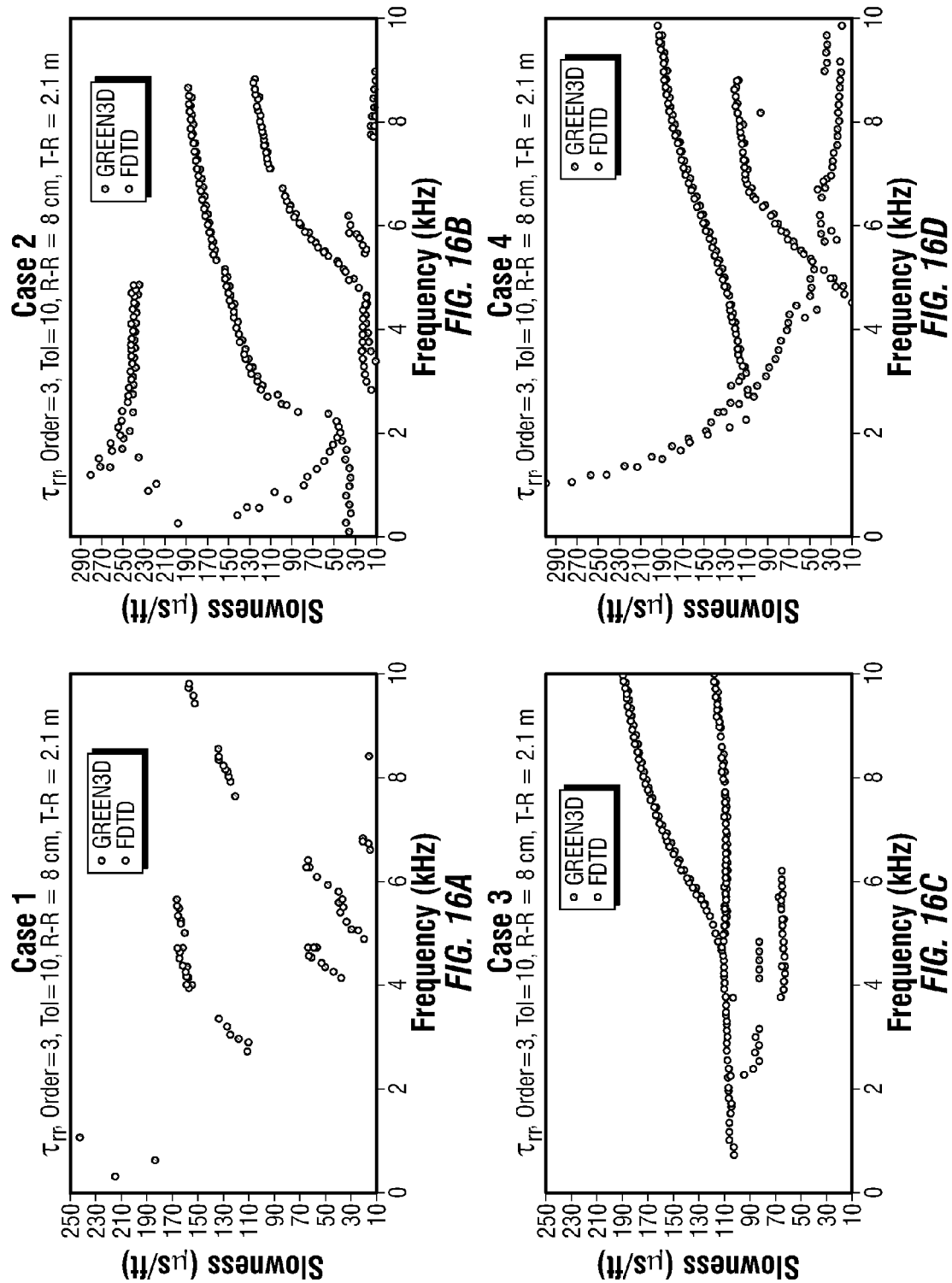
FIGS. 16a-16f are slowness versus frequency plots showing respectively flexural dispersions resulting from the processing of the waveforms of FIG. 15a-15f.

The dispersion plot of FIG. 16*a* (which relates to the arrangement of FIG. 10*a* with two water annuli—"case 1") shows multiple formation flexural waveforms that have the signature of increasing in slowness (higher slowness values) as the frequency increases. For example, one formation flexural waveform dispersion is seen starting at a slowness of 30 μs/ft at a frequency of just over 4 kHz and increasing to a slowness of 60 μs/ft at a frequency of 5 kHz, while another formation flexural waveform dispersion is seen starting at a slowness of 10 μs/ft at a frequency of just over 5 kHz and increasing to a slowness of just over 60 μs/ft at a frequency of 6.5 kHz. FIG. 16*b* (which relates to the arrangement of FIG. 10*b* with a cement annulus between the casings and a water annulus behind the outer casing-"case 2") likewise depicts formation flexural dispersions. However, FIG. 16*b* also depicts a dipole flexural waveform starting at a slowness of approximately 90 μs/ft at a frequency of 2.5 kHz and increasing to a slowness of 190 μs/ft at a frequency of 9 kHz. FIG. 16*b* further reveals a drill collar-like flexural mode dispersion starting at a slowness of approximately 280 μs/ft at a frequency of 1.75 kHz and decreasing to a slowness of approximately 240 μs/ft at a frequency of 5 kHz, as well as a casing flexural dispersion starting at a slowness of approximately 140 μs/ft at a frequency of 0.5 kHz and decreasing to a slowness of approximately 50 μs/ft at a frequency of 2 kHz.

The dispersion plots of FIG. 16*a* and FIG. 16*b* can be compared to the dispersion plot of FIG. 16*c* for the fully bonded (reference) arrangement ("case 3"). FIG. 16*c* reveals a dipole flexural waveform extending increasing from a slowness of approximately 110 μs/ft at 5 kHz to a slowness of approximately 190 μs/ft at a frequency of 10 kHz, as well as a higher-order flexural dispersion that is relatively constant at a slowness of approximately 110 μs/ft from 5 kHz to 10 kHz. The dipole flexural waveform and higher-order flexural dispersions are merged at a slowness of approximately 110 μs/ft from 1 kHz to 5 kHz. The kick-in frequency for the dipole flexural waveform for case 3 is approximately 5 kHz, whereas the kick-in frequency for the dipole flexural waveform in case 2 discussed above and cases 4-6 discussed below is approximately 2.5 kHz.

Figure 16F:
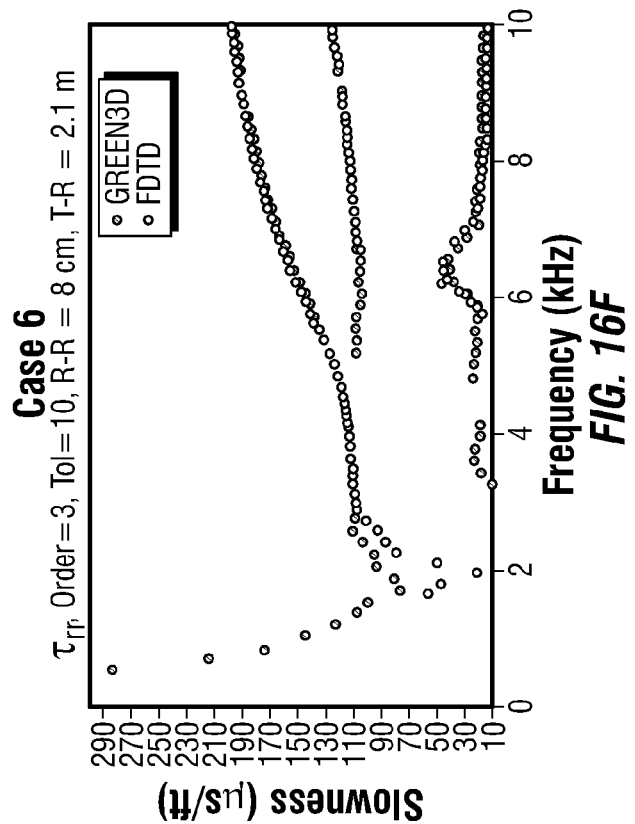
Figure 16E:
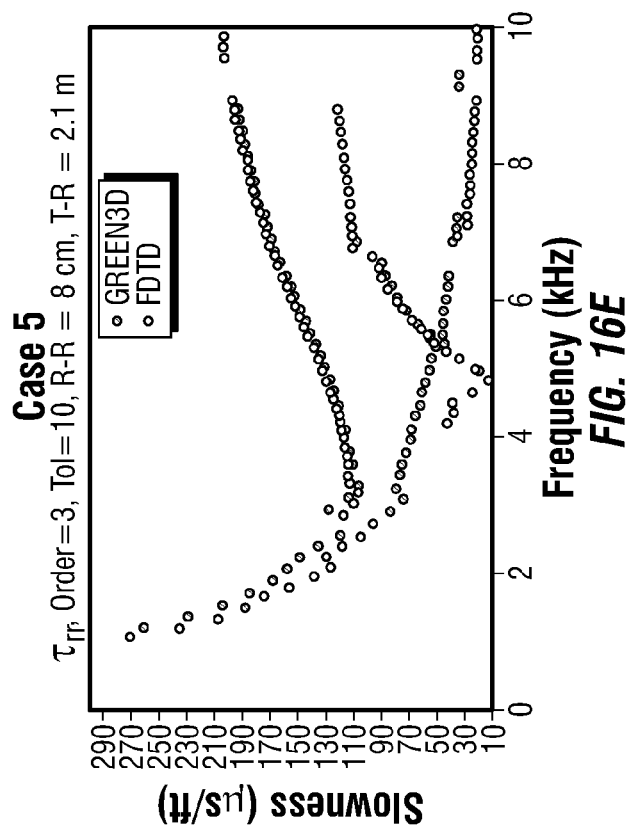

FIGS. 16*d*-16*f* show dispersion plots for cases 4-6 which have a micro-annulus at a casing-cement interface. FIGS. 16*d*-16*f* each includes a casing flexural dispersion decreasing from a slowness of approximately 280 μs/ft at a frequency of about 1 kHz to a slowness of 90 μs/ft at a frequency of about 2 kHz as well as a formation flexural dispersion increasing from a slowness of about 10 μs/ft at a frequency of about 4.5 or 5 kHz to a slowness of 90 μs/ft (in FIG. 16*d* and 16*e*) or 45 μs/ft (in FIG. 16*0* at a frequency of about 6.5 kHz. Each also includes the dipole flexural waveform increasing from a slowness of approximately 110 μs/ft at 2.5 kHz (the kick-in frequency) to a slowness of approximately 190 μs/ft at a frequency of 10 kHz. FIG. 16*f* also reveals a higher order flexural dispersion from 5 kHz to 10 kHz at a relatively constant slowness of approximately 110 μs/ft.

Figure 17A:
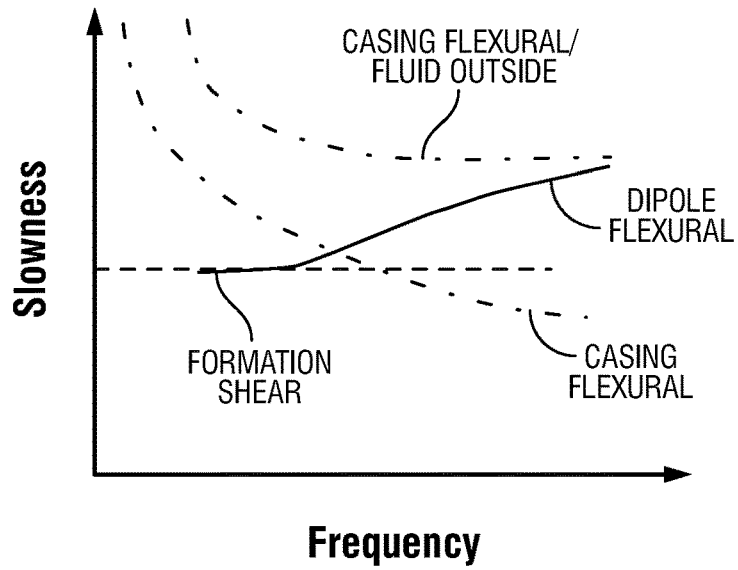
FIGS. 17a and 17b are slowness versus frequency graphics, with FIG. 17a representing dipole dispersions in the presence of steel casings where fluid annuli are present such that drill collar-like flexural and casing flexural modes are present, and FIG. 17b representing a reference well-bonded cased-hole geometry where dipole flexural and higher-order flexural dispersions are shown.
Figure 17B:
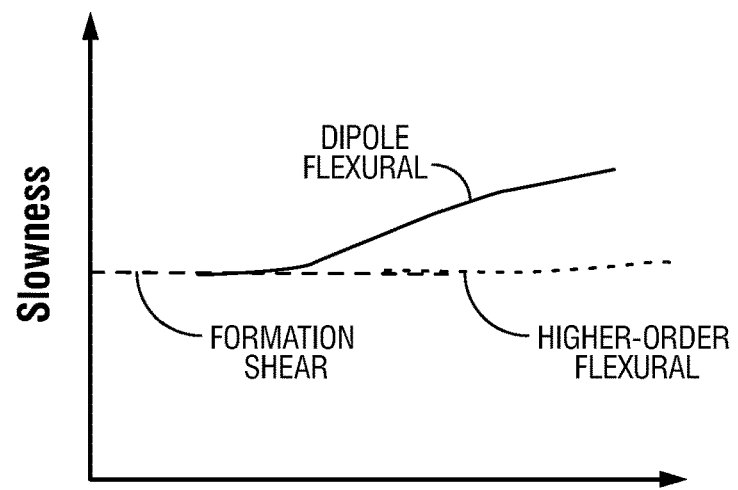

Turning to FIG. 17*a*, a graphic is seen of dipole dispersions depicting results in a double steel casing with a fluid annulus on the inner surface of the outer casing and another fluid annulus between the outer casing and the formation. FIG. 17*a* shows a drill collar-like flexural mode dispersion (compare FIG. 16*b*), a casing flexural dispersion (compare FIGS. 16d-16f), and a dipole flexural mode dispersion (compare FIGS. 16c-16f). FIG. 17a also provides a formation shear wave. For reference, FIG. 17b is a schematic similar to FIG. 16c and provides the dipole flexural and higher-order flexural dispersions that are obtained in the presence of a reference well-bonded cased-hole geometry. FIG. 17b also includes a reference shear wave dispersion (dashed).

Figure 18:
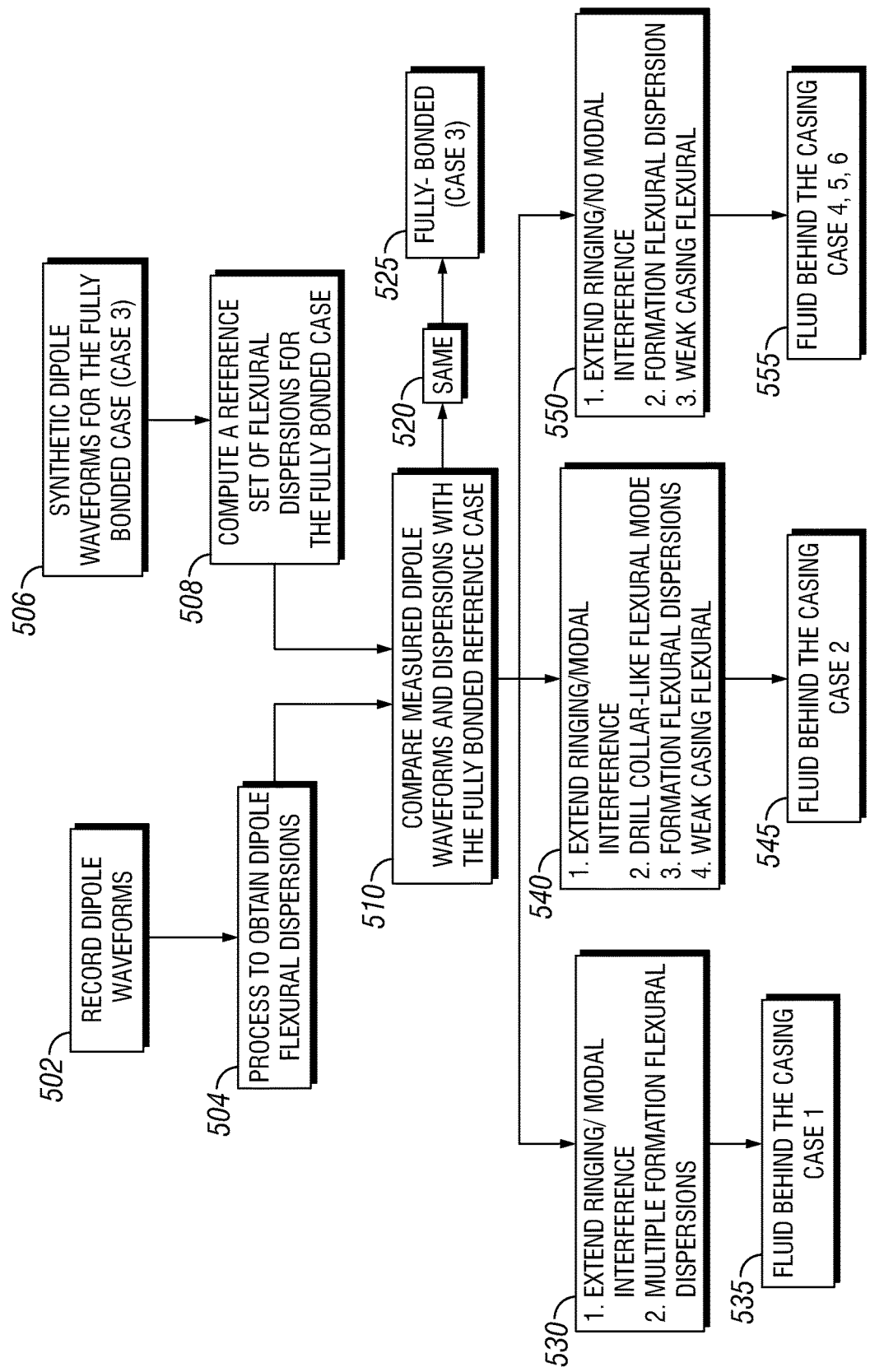
FIG. 18 is a flow chart of a method for detecting debond or fluid layers specifics in the cement in the cement annulus/annuli of a borehole having a concentrically placed single casing or double steel casings using signature results from dipole flexural waveforms generated by a sonic tool.

In one embodiment, a method of detecting fluid annuli and/or debonding of a cement annulus from a casing of a double-cased borehole is shown in FIG. 18. Thus, at 502, a sonic tool with a dipole source is placed in the borehole (wellbore) of interest and activated such that dipole waveforms are generated and recorded. The waveforms may be similar to one of those shown in FIGS. 15a-15f. At 504, the dipole waveforms are processed to obtain dispersion plots, e.g., by using various a modified matrix pencil algorithm such as TKO as previously described or other processing. At 506 synthetic dipole waveforms for the ideal fully-bonded (reference) borehole ("case 3") corresponding to the borehole of interest is generated using an appropriate modeling tool. The modeling tool will generally account for the diameters of the casings, the thicknesses of the cement annuli, elastic properties (expressed by Lame constants, $\lambda$ and $\mu$) and mass densities of the borehole fluid, casing material, cement, and formation, and the waveforms may take a form similar to FIG. 15c. At 508, a reference set of dispersions for the full-bonded borehole are generated using TKO or other processing. This reference set of dispersions may take a form similar to FIG. 16c. At 510, in one embodiment, the dispersion plots obtained at 504 are compared to the reference plots of 508 over a desired frequency range such as 0-10 kHz. In another embodiment, both the waveforms and the dispersion plots are compared. If the dispersion plots are essentially identical, with a dipole flexural dispersion and a higher order flexural dispersion in the frequency range of interest and with no formation or casing flexural dispersions at 520, it is determined at 525 that the borehole of interest has two cement annuli that are fully bonded to the casings (case 3) at the location at which the waveforms were obtained. If, on the other hand, a formation or casing flexural dispersion is present and/or there is no dipole flexural or higher order flexural dispersion, then the borehole of interest is identified as not having fully-bonded cement annuli at that location.

More particularly, if there is no dipole flexural or higher order flexural dispersion and there are multiple formation flexural dispersions at 530, it may be concluded at 535 that there is fluid behind both casings (case 1). In one aspect, the conclusion of fluid behind both casings at the location of measurement may be confirmed by determining that the waveforms obtained at 502 have modal interference and extended ringing relative to the waveforms of 506.

Similarly, if a drill collar-like flexural mode dispersion, a casing flexural dispersion and a formation flexural dispersion are present (and no higher order flexural dispersion) at 540, it may be concluded at 545 that there is a good cement annulus between the casings but that there is fluid behind the outer casing (case 2). In one aspect, the conclusion of the existence of fluid behind the outer casing at the location of measurement may be confirmed by determining that the waveforms obtained at 502 have modal interference and extended ringing relative to the waveforms of 506.

If the dispersions obtained at 504 and compared at 510 include a formation flexural dispersion and a casing flexural dispersion (and no higher order flexural dispersion) at 550, it may be concluded at 555 that there are two cement annuli but that there is a micro-annulus (debonding) between a casing and one of the cement annuli (case 4, case 5 or case 6). In one aspect, the conclusion of the existence of a micro-annulus may be confirmed by determining that the waveforms obtained at 502 have extended ringing relative to the waveforms of 506 and have no modal interference. In another aspect, the presence and specifics of a casing extensional mode dispersion may be used to distinguish amongst cases 4, 5, and 6 based on their slightly different signatures.

In one embodiment, the dispersions obtained at 504 and the dispersions computed at 508 are plotted on a single graph (as in FIG. 6) with different indicia (e.g., different colors or dots versus squares) that may be visually inspected for similarities and differences. In another embodiment, the dispersions obtained at 504 and the dispersions computed at 508 are plotted on different graphs (as in FIGS. 16c and any of FIGS. 16a, 16b, 16d, 16e and 16f) that may be visually inspected side by side for similarities and differences. In another embodiment, the dispersions obtained at 504 and the dispersions computed at 508 are compared by a processor that provides a chart or other readable output of the differences. In all embodiments, the comparison of the dispersions obtained at 504 and at 508 may be conducted at multiple depths in the borehole.

According to one aspect, the dipole waveforms are recorded at multiple locations in the wellbore. If the waveforms at a particular location have extended ringing and/or after processing, formation dispersions, drill collar-like dispersions, or casing flexural dispersions are found at a particular location, remedial action may be taken. Remedial action may include perforating one or both of the casings and injecting cement at an identified location to fill an annulus or a micro-annulus. Remedial action may be important in order to permit hydrocarbon production without contaminating aquifers. Remedial action may also be important in preventing toxic gas from escaping from the formation into the atmosphere.

In one embodiment, both monopole and dipole sources are used in a doubly-cased borehole and monopole and dipole waveforms are recorded and used to obtain dispersion plots. The dispersion plots are compared to reference dispersion plots in order to determine whether or not the casings in the borehole are fully bonded. Where the casings are not fully bonded remedial action may be taken. In another embodiment, both monopole and dipole sources are used in a doubly-case borehole and monopole and dipole waveforms are recorded. The monopole and dipole waveforms are compared to reference waveforms in order to determine whether or not the casings in the borehole are fully bonded. By way of example only, if there is extended ringing in the monopole waveform compared to the reference monopole waveform and extended ringing and modal interference in the dipole waveform compared to the reference dipole waveform, it may be concluded that there is water in both annuli (case 1). On the other hand, if there are two dominant dispersive arrivals in the monopole waveform and extended ring and modal interference in the dipole waveform, it may be concluded that there is a cement annulus between the casings and a water annulus behind the outer casing (case 2). Compact waveforms in the monopole waveform and extended ringing with no modal interference in the dipole waveform may be indicative of a micro-annulus (cases 4, 5, and 6).

Figure 19A:
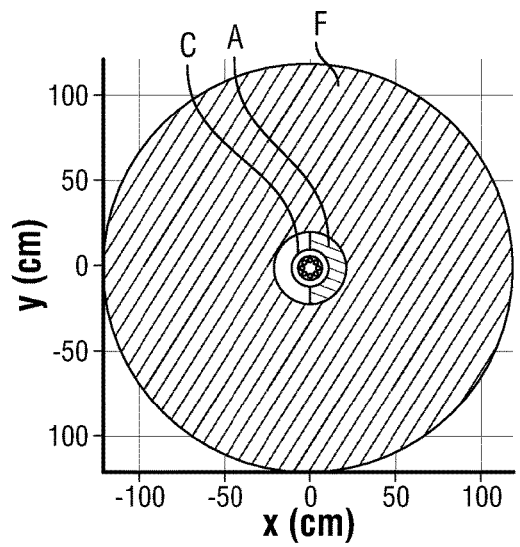
FIGS. 19a and 19b are diagrams, with FIG. 19a representing a cased-hole with lower-impedance cement/formation annuli over 180 degrees of azimuth, and FIG. 19b showing the location of four azimuthal receivers.
Figure 19B:
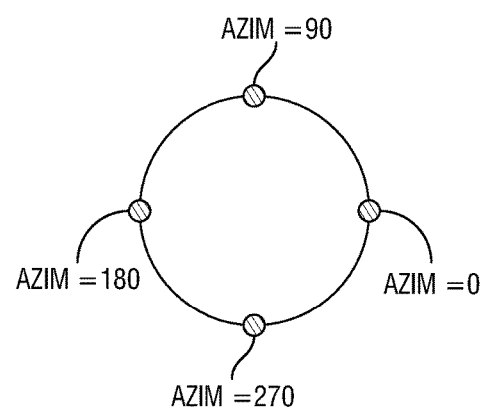
Figure 20A:
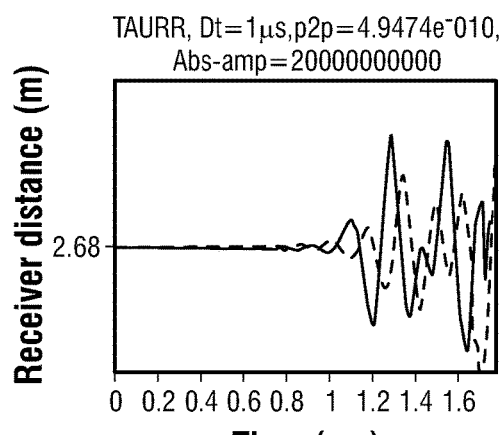
FIGS. 20a and 20b are diagrams, with FIG. 20a showing a comparison of synthetic compressional arrivals recorded by receivers at azimuth=0 and azimuth=180 degrees for the arrangement shown in FIG. 19a, and FIG. 20b showing a compressional arrival for the same receivers in a well-bonded cased-hole in a radially homogeneous formation.
Figure 20B:
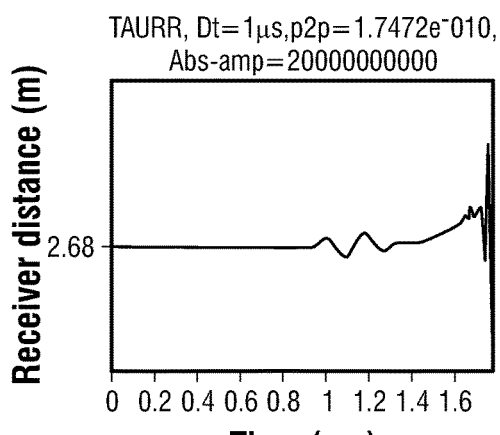

In one aspect, it will be appreciated that the bonding of the cement annuli around the casings may not be uniform three hundred sixty degrees around the casings, and it may be desirable to find locations along the borehole where the cement annuli are not uniform. FIG. 19a is a graphic of a cross-sectional view of a cased-hole C in a formation F with a lower-impedance cement/formation annulus A extending along 180 degrees of azimuth. FIG. 19b is a schematic diagram of four azimuthal receivers arranged about the circumference of a borehole sonic tool. FIG. 20a shows the synthetic compressional arrivals recorded by receivers at azimuth=0 and those at azimuth=180 degrees for the borehole configuration of FIG. 19a. As seen in FIG. 20a, the arrivals recorded by the respective receivers for are substantially out of phase. In contrast, FIG. 20b shows the synthetic compressional arrivals recorded by the same receivers for a reference well-bonded cased-hole in a radially homogeneous formation where the arrivals are in phase. Differences between the two signatures are indicators of azimuthal non-uniformity in the cement or formation properties around the steel casing.

Figure 21A:
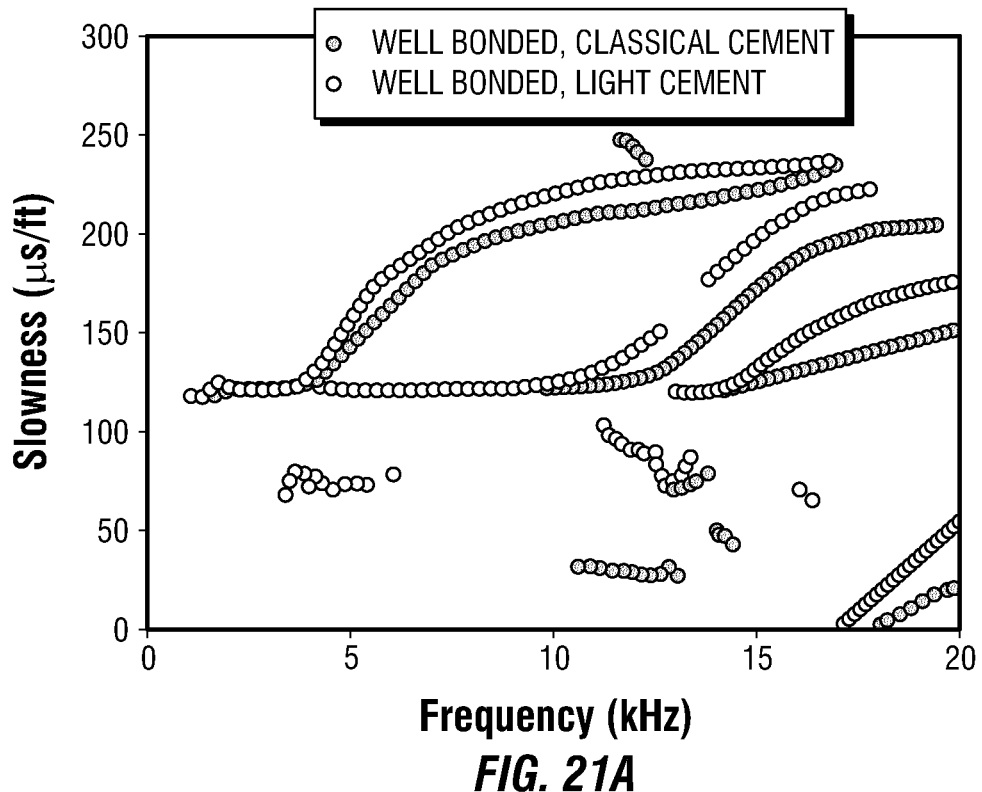
FIGS. 21a-21c are slowness versus frequency plots showing dispersions obtained by processing waveforms generated using a dipole source in the arrangement of a single-cased borehole such as shown in FIG. 1 where the cement is well-bonded to the formation, where water is found between the cement and the formation, and where air is found between the cement and the formation, respectively.
Figure 21B:
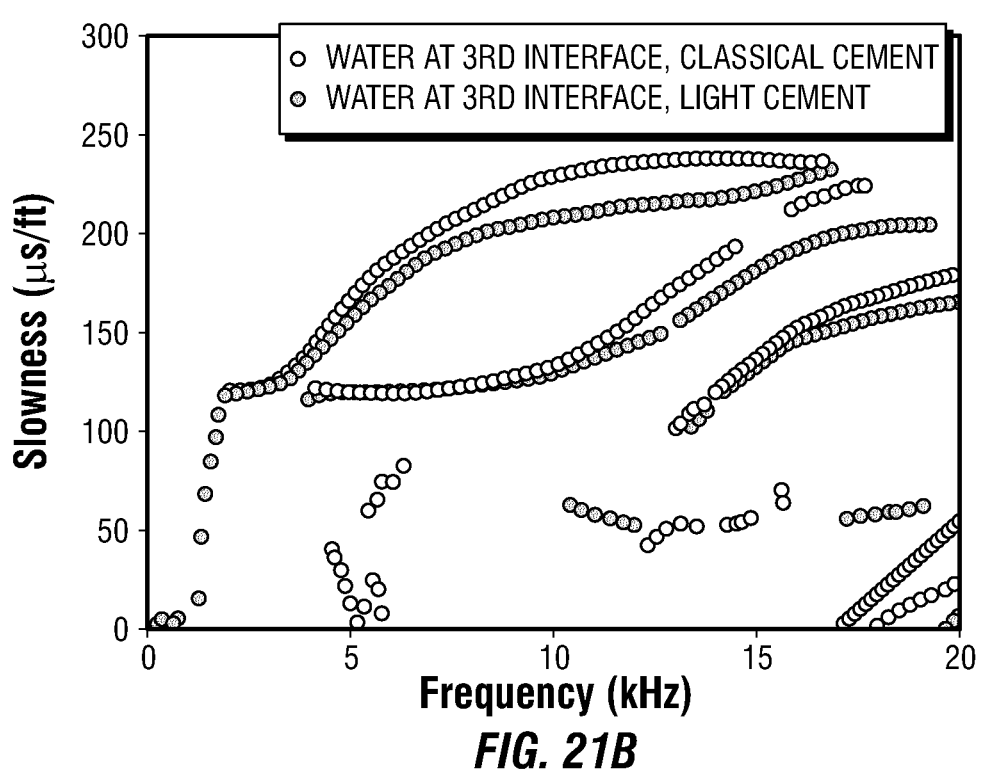
Figure 21C:
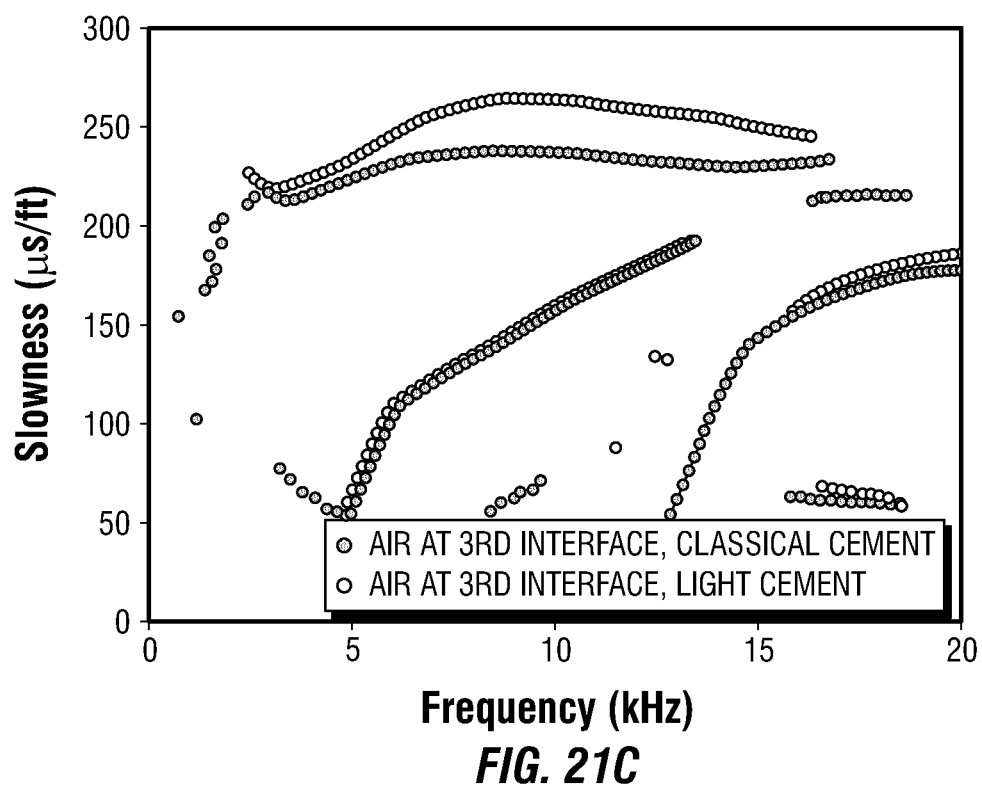

According to another aspect, the presence of gas (e.g., air) at an interface between cement that surrounds a single cased borehole and the formation provides one or more additional dispersion plot signatures. In particular, FIGS. 21a, 21b and 21c show dispersion plots obtained by processing waveforms generated using a dipole source in the arrangement of a single-cased borehole such as shown in FIG. 1 where the cement is well-bonded to the formation, where water is found between the cement and the formation, and where air is found between the cement and the formation, respectively. In FIGS. 21a-21c, two sets of curves are provided, a first for the situation using "classical" cement, and the second for the situation using "light" cement. Regardless, FIGS. 21a and 21b closely correspond to curves A and B of FIG. 3 and show dipole flexural waveforms increasing from a slowness of approximately 110 µs/ft at 2 kHz to a slowness of approximately 190 or 200 µs/ft at a frequency of 10 kHz. FIGS. 21 and 21b also show higher-order flexural dispersions (such as formation shear) that are relatively constant at a slowness of approximately 110 µs/ft from 5 kHz to 10 kHz. FIG. 21c, on the other hand, does not correspond to the curves of FIG. 3. FIG. 21c does not reveal a dipole flexural dispersion starting at a slowness of approximately 110 µs/ft at 2 kHz, but rather appears to have casing flexural dispersion above 200 µs/ft. In addition, FIG. 21c does not reveal a relatively constant formation shear (higher-order flexural) dispersion at a slowness of approximately 110 µs/ft from 5 kHz to 10 kHz.

As will be appreciated from previously-described embodiments, the dispersion plots obtained may be compared to reference plots over a desired frequency range such as 0-10 kHz. If the dispersion plots are essentially identical, with a dipole flexural dispersion and a higher order flexural dispersion in the frequency range of interest it can be determined that the borehole of interest has a well-bonded casing. If, on the other hand, a casing flexural dispersion is revealed, and/or a first order or a higher order formation flexural dispersion is not present, then the borehole of interest is identified as having gas between the cement and the formation.

Figure 22A:
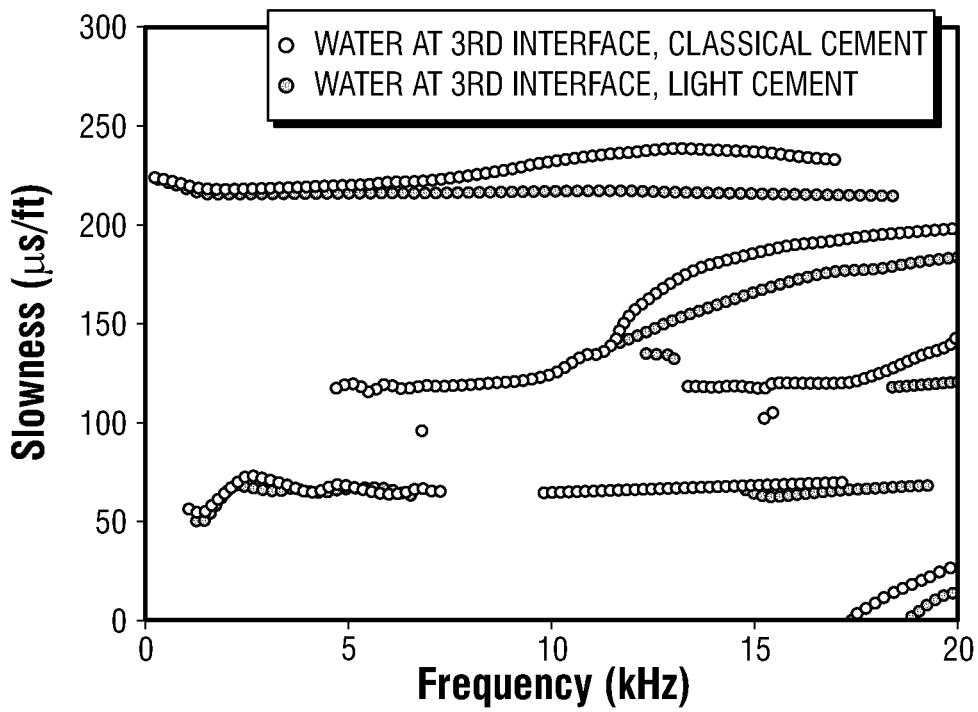
FIGS. 22a and 22b are slowness versus frequency plots showing dispersions obtained by processing waveforms generated using a monopole source in the arrangement of a single-cased borehole such as shown in FIG. 1 where water is found between the cement and the formation, and where air is found between the cement and the formation, respectively.
Figure 22B:
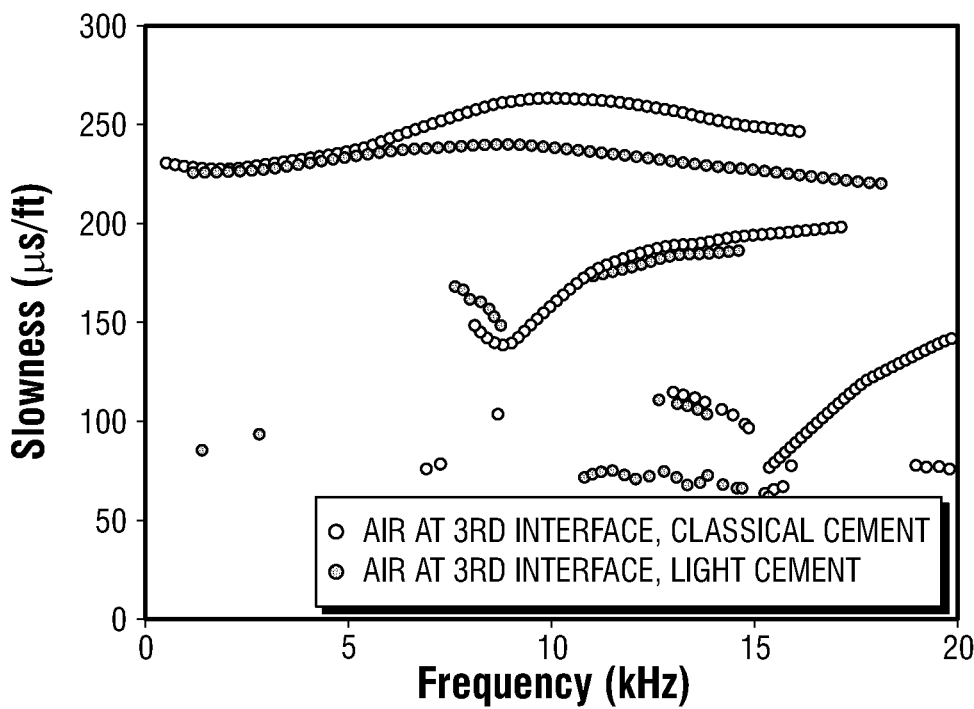

Turning to FIGS. 22a and 22b, dispersion plots obtained by processing waveforms generated using a monopole source in the arrangement of a single-cased borehole such as shown in FIG. 1 where water is found between the cement and the formation, and where air is found between the cement and the formation, respectively. In FIGS. 22a and 22b, two sets of curves are provided, a first for the situation using "classical" cement, and the second for the situation using "light" cement. Regardless, FIG. 22a closely corresponds to curve B of FIG. 2 and shows Stoneley dispersions at a slowness of approximately 220 µs/ft from 1 kHz to 10 kHz. FIG. 22a also reveals pseudo-Rayleigh (formation shear) dispersions at a slowness of approximately 110 µs/ft from 5 kHz to 10 kHz. FIG. 22b, on the other hand, does not correspond to curve B (or curve A) of FIG. 2. The Stoneley dispersions for the classical and light cement are considerably slower (225 µs/ft and rising to 230 to 250 µs/ft at 10 kHz). In addition, the formation shear dispersion is not present.

The dispersion plots obtained, such as FIG. 22b, may be compared to reference plots over a desired frequency range such as 0-10 kHz. If the dispersion plots are essentially identical, with Stoneley dispersions at the same slownesses and similar pseudo-Rayleigh dispersions in the frequency range of interest, it can be determined that the borehole of interest has a well-bonded casing. If, on the other hand, the Stoneley dispersion is at an increased slowness and the pseudo-Rayleigh dispersion is not present, then the borehole of interest can be identified as having gas between the cement and the formation.

In one embodiment, the obtained dispersions (monopole or dipole or both) may be plotted on a single graph with corresponding computed dispersions but with different indicia (e.g., different colors or dots versus squares) that may be visually inspected for similarities and differences. In another embodiment, the obtained dispersions obtained and the computed dispersions are plotted on different graphs that may be visually inspected side by side for similarities and differences. In another embodiment, the obtained and computed dispersions are compared by a processor that provides a chart or other readable output of the differences. In all embodiments, the comparison of the dispersions may be conducted at multiple depths in the borehole.

According to one aspect, if it is determined that there is gas between the cement annulus and the formation remedial action may be taken.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method for characterizing at least one property of a cased borehole traversing a formation, wherein said cased borehole includes at least one casing with a corresponding annulus that surrounds the casing, said method comprising:
   a) locating a sonic tool at a location in the cased borehole, wherein the sonic tool includes a plurality of spaced receivers and at least one sonic source;
   b) with the sonic tool located at the location in the cased borehole, transmitting acoustic energy that interacts with the cased borehole by said at least one sonic source and recording sonic waveforms that result from the interaction of the acoustic energy with the cased borehole by said plurality of spaced receivers;

c) processing said sonic waveforms to obtain a first dispersion plot of slowness as a function of frequency for the location in the cased borehole;

d) generating at least one reference dispersion plot of slowness as a function of frequency for the cased borehole based on geometry of the cased borehole and at least one assumption that the at least one annulus contains cement that is well-bonded to the corresponding casing that it surrounds;

e) using a processor or visual inspection to determine differences between said first dispersion plot and said at least one reference dispersion plot; and f) determining at least one property characterizing integrity of the cased borehole for the location in the cased borehole based upon the differences between said first dispersion plot and said at least one reference dispersion plot, wherein the at least one property indicates presence of fluid in the at least one annulus of the cased borehole or presence of debonding of cement contained in the at least one annulus of the cased borehole.

2. A method according to claim 1, wherein:
said at least one sonic source comprises a monopole sonic source; and
the at least one property determined in f) is based upon a first Stoneley mode dispersion in a predetermined frequency range that is part of said first dispersion plot being slower than a reference Stoneley mode dispersion in the predetermined frequency range that is part of said at least one reference dispersion plot.

3. A method according to claim 1, wherein:
said at least one sonic source comprises a dipole sonic source; and
the at least one property determined in f) is based upon a reference kick-in frequency of a reference flexural dispersion that is part of said at least one reference dispersion plot being offset from a first kick-in frequency of a first flexural dispersion that is part of said first dispersion plot.

4. A method according to claim 1, wherein:
said at least one sonic source comprises a dipole sonic source; and
the at least one property determined in f) is based upon a first flexural dispersion in a predetermined frequency range that is part of said first dispersion plot being slower than a reference flexural dispersion in the predetermined frequency range that is part of said at least one reference dispersion plot.

5. A method according to claim 1, wherein:
said at least one sonic source comprises a dipole sonic source; and
the at least one property determined in f) indicates presence of gas in the at least one annulus of the cased borehole, which is determined based upon the first dispersion plot including a flexural dispersion and the reference dispersion plot including a reference flexural dispersion.

6. A method according to claim 1, wherein:
said at least one sonic source comprises a monopole sonic source; and
the at least one property determined in f) indicates presence of gas in the at least one annulus of the cased borehole, which is based upon the first dispersion plot including a Stoneley dispersion not including a pseudo-Rayleigh dispersion in a first identified frequency range and the reference dispersion plot including a Stoneley dispersion and a pseudo-Rayleigh dispersion in said first identified frequency range.

7. A method according to claim 1, wherein:
the cased borehole comprises an inner casing and an outer casing, a first annulus disposed between the inner and outer casings, and a second annulus between the outer casing and the formation;
said at least sonic source comprises a monopole sonic source;
said at least one assumption comprises an assumption that the first annulus and the second annulus both contain cement that is well-bonded to the corresponding casing that it surrounds; and
the at least one property determined in f) indicates presence of fluid in one of the first annulus and second annulus of the cased borehole, which is based upon the reference dispersion plot including a reference Stoneley dispersion and a reference pseudo-Rayleigh dispersion and the first dispersion plot including a first Stoneley dispersion and a second Stoneley dispersion.

8. A method according to claim 7, wherein:
the at least one property determined in f) indicates presence of fluid in the second annulus of the cased borehole, which is based upon the first dispersion plot including a casing extensional dispersion.

9. A method according to claim 7, wherein:
the at least one property determined in f) indicates presence of fluid in both the first annulus and the second annulus of the cased borehole, which is based upon the first dispersion plot not including a casing extensional dispersion.

10. A method according to claim 1, wherein:
said at least sonic source comprises a monopole sonic source; and
the at least one property determined in f) indicates presence of a micro-annulus in the at least one annulus of the cased borehole, which is based upon the reference dispersion plot including a reference Stoneley dispersion and a reference pseudo-Rayleigh dispersion and the first dispersion plot including a first Stoneley dispersion and a casing extensional dispersion.

11. A method according to claim 1, wherein:
the cased borehole comprises an inner casing and an outer casing, a first annulus disposed between the inner and outer casings, and a second annulus between the outer casing and the formation;
said at least sonic source comprises a dipole sonic source;
said at least one assumption comprises an assumption that the first annulus and the second annulus both contain cement that is well-bonded to the corresponding casing that it surrounds; and
the at least one property determined in f indicates presence of fluid in one of the first annulus and second annulus of the cased borehole, which is based upon the reference dispersion plot including a reference dipole flexural dispersion and a reference higher order flexural dispersion and the first dispersion plot containing multiple formation flexural dispersions and no higher order flexural dispersion.

12. A method according to claim 1, wherein:
the cased borehole comprises an inner casing and an outer casing, a first annulus disposed between the inner and outer casings, and a second annulus between the outer casing and the formation;
said at least one sonic source comprises a dipole sonic source;

said at least one assumption comprises an assumption that the first annulus and the second annulus both contain cement that is well-bonded to the corresponding casing that it surrounds; and the at least one property determined in f) indicates presence of fluid in both the first annulus and second annulus of the cased borehole, which is based upon the first dispersion plot not containing a dipole flexural dispersion.

13. A method according to claim 1, wherein:
the cased borehole comprises an inner casing and an outer casing, a first annulus disposed between the inner and outer casings, and a second annulus between the outer casing and the formation;
said at least sonic source comprises a dipole sonic source;
said at least one assumption comprises an assumption that the first annulus and the second annulus both contain cement that is well-bonded to the corresponding casing that it surrounds; and
the at least one property determined in f) indicates presence of fluid in the second annulus of the cased borehole, which is based upon the first dispersion plot including a drill collar flexural mode.

14. A method according to claim 1, wherein:
the cased borehole comprises an inner casing and an outer casing, a first annulus disposed between the inner and outer casings, and a second annulus between the outer casing and the formation;
said at least sonic source comprises a dipole sonic source;
said at least one assumption comprises an assumption that the first annulus and the second annulus both contain cement that is well-bonded to the corresponding casing that it surrounds; and
the at least one property determined in f) indicates presence of a micro-annulus in at least one of the first annulus and the second annulus of the cased borehole, which is based upon the reference dispersion plot including a reference dipole flexural dispersion and a reference higher order flexural dispersion and the first dispersion plot including a casing flexural dispersion.

15. A method according to claim 1, wherein:
said first dispersion plot and said reference dispersion plot include slownesses as a function of frequency over a frequency range of at least 1 kHz to 8 kHz.

16. A method according to claim 1, further comprising:
g) based on the determining of f), performing remedial action in the cased borehole in order to fully bond cement to said at least one casing of the cased borehole.

17. A method according to claim 1, where the cased borehole comprises an inner casing and an outer casing, a first annulus disposed between the inner and outer casings, and a second annulus between the outer casing and the formation, further comprising:
generating a first monopole waveform plot for said plurality of receivers as a function of time;
generating a reference monopole waveform plot based on geometry of the cased borehole and an assumption that both said first annulus and said second annulus contain cement that is well-bonded to its corresponding casing;
comparing said first monopole waveform plot and said reference monopole waveform plot to determine whether said first monopole waveform plot has extended ringing in said waveform plot relative to said reference monopole waveform plot.

18. A method according to claim 17, wherein:
if said first monopole waveform plot has said extended ringing, determining that both said first annulus and said second annulus contain fluid, and
if said first monopole waveform plot does not have extended ringing, determining that said second annulus contains fluid.

19. A method according to claim 1, where the cased borehole comprises an inner casing and an outer casing, a first annulus disposed between the inner and outer casings, and a second annulus between the outer casing and the formation, further comprising:
generating a first dipole waveform plot for said plurality of receivers as a function of time;
generating a reference dipole waveform plot based on geometry of the cased borehole and an assumption that both said first annulus and said second annulus contain cement that is well-bonded to its corresponding casing;
comparing said first dipole waveform plot and said reference dipole waveform plot to determine whether said first dipole waveform plot has modal interference in said waveform plot relative to said reference dipole waveform plot, and if so, confirming that at least one of said first annulus and said second annulus contains fluid.

20. A method for characterizing at least one property of a cased borehole traversing a formation, wherein said cased borehole includes at least one casing with a corresponding annulus that surrounds the casing, said method comprising:
a) locating a sonic tool at a location in the cased borehole, wherein the sonic tool includes a plurality of spaced receivers and at least one sonic source;
b) with the sonic tool located at the location in the cased borehole, transmitting acoustic energy that interacts with the cased borehole by said at least one sonic source and recording sonic waveforms that result from the interaction of the acoustic energy with the cased borehole by said plurality of spaced receivers;
c) processing the sonic waveforms to generate a dispersion plot signature for the location in the cased borehole;
d) generating a reference dispersion plot signature for the cased borehole based on geometry of the cased borehole and at least one assumption that the at least one annulus contains cement that is well-bonded to the corresponding casing that it surrounds;
e) using a processor or visual inspection to determine differences between said first dispersion plot signature and said reference dispersion plot signature; and
f) determining at least one property characterizing integrity of the cased borehole for the location in the cased borehole based upon the differences between said first dispersion plot signature and said reference dispersion plot signature, wherein the at least one property indicates presence of fluid in the at least one annulus of the cased borehole or presence of debonding of cement contained in the at least one annulus of the cased borehole.

21. A method according to claim 20, wherein:
the cased borehole comprises an inner casing and an outer casing, a first annulus disposed between the inner and outer casings, and a second annulus between the outer casing and the formation;
the at least one sonic source comprises a monopole source;
the at least one property determined in f) indicates presence of fluid in at least one of the first annulus and the second annulus of the cased borehole, which is based on said reference dispersion plot signature including a reference Stoneley dispersion and a reference pseudo-Rayleigh dispersion and said first dispersion plot signature including a first Stoneley dispersion and a second Stoneley dispersion.

22. A method according to claim 21, wherein:
the at least one property determined in f) indicates presence of fluid in the second annulus of the cased borehole, which is based on said first dispersion plot signature further including a casing extensional dispersion.

23. A method according to claim 21, wherein:
the at least one property determined in f) indicates presence of fluid in both the first annulus and the second annulus of the cased borehole, which is based on said first dispersion plot signature not including a casing extensional dispersion.

24. A method according to claim 20, wherein:
the cased borehole comprises an inner casing and an outer casing, a first annulus disposed between the inner and outer casings, and a second annulus between the outer casing and the formation;
the at least one sonic source comprises a monopole source; and
the at least one property determined in f) indicates presence of a micro-annulus in at least one of the first annulus and the second annulus of the cased borehole, which is based on said reference dispersion plot signature including a reference Stoneley dispersion and a reference pseudo-Rayleigh dispersion and said first dispersion plot signature including a first Stoneley dispersion and a casing extensional dispersion.

25. A method according to claim 20, wherein:
the cased borehole comprises an inner casing and an outer casing, a first annulus disposed between the inner and outer casings, and a second annulus between the outer casing and the formation;
the at least one sonic source comprises a dipole source; and
the at least one property determined in f) indicates presence of fluid in at least one of the first annulus and the second annulus of the cased borehole, which is based on said reference dispersion plot signature including a reference dipole flexural dispersion and a reference higher order flexural dispersion and said first dispersion plot signature including multiple formation flexural dispersions and no higher order flexural dispersion.

26. A method according to claim 25, wherein:
the at least one property determined in f) indicates presence of fluid in both the first annulus and the second annulus of the cased borehole, which is based on said first dispersion plot signature not including a dipole flexural dispersion.

27. A method according to claim 25, wherein:
the at least one property determined in f) indicates presence of fluid in the second annulus of the cased borehole, which is based on said first dispersion plot signature including a drill collar flexural mode.

28. A method according to claim 20, wherein:
the cased borehole comprises an inner casing and an outer casing, a first annulus disposed between the inner and outer casings, and a second annulus between the outer casing and the formation;
the at least one sonic source comprises a dipole source; and
the at least one property determined in f) indicates presence of a micro-annulus in at least one of the first annulus and the second annulus of the cased borehole, which is based on said reference dispersion plot signature including a reference dipole flexural dispersion and a reference higher order flexural dispersion and said first dispersion plot signature including a casing flexural dispersion.

29. A method according to claim 20, wherein:
said first dispersion plot signature and said reference dispersion plot signature includes slownesses as a function of frequency over a frequency range of at least 1 kHz to 8 kHz.

30. A method according to claim 20, further comprising:
g) based on the determining of f), performing remedial action in the cased borehole in order to fully bond cement to said at least one casing of the cased borehole.

* * * * *